INVENTOR.
RALPH BENGHIAT

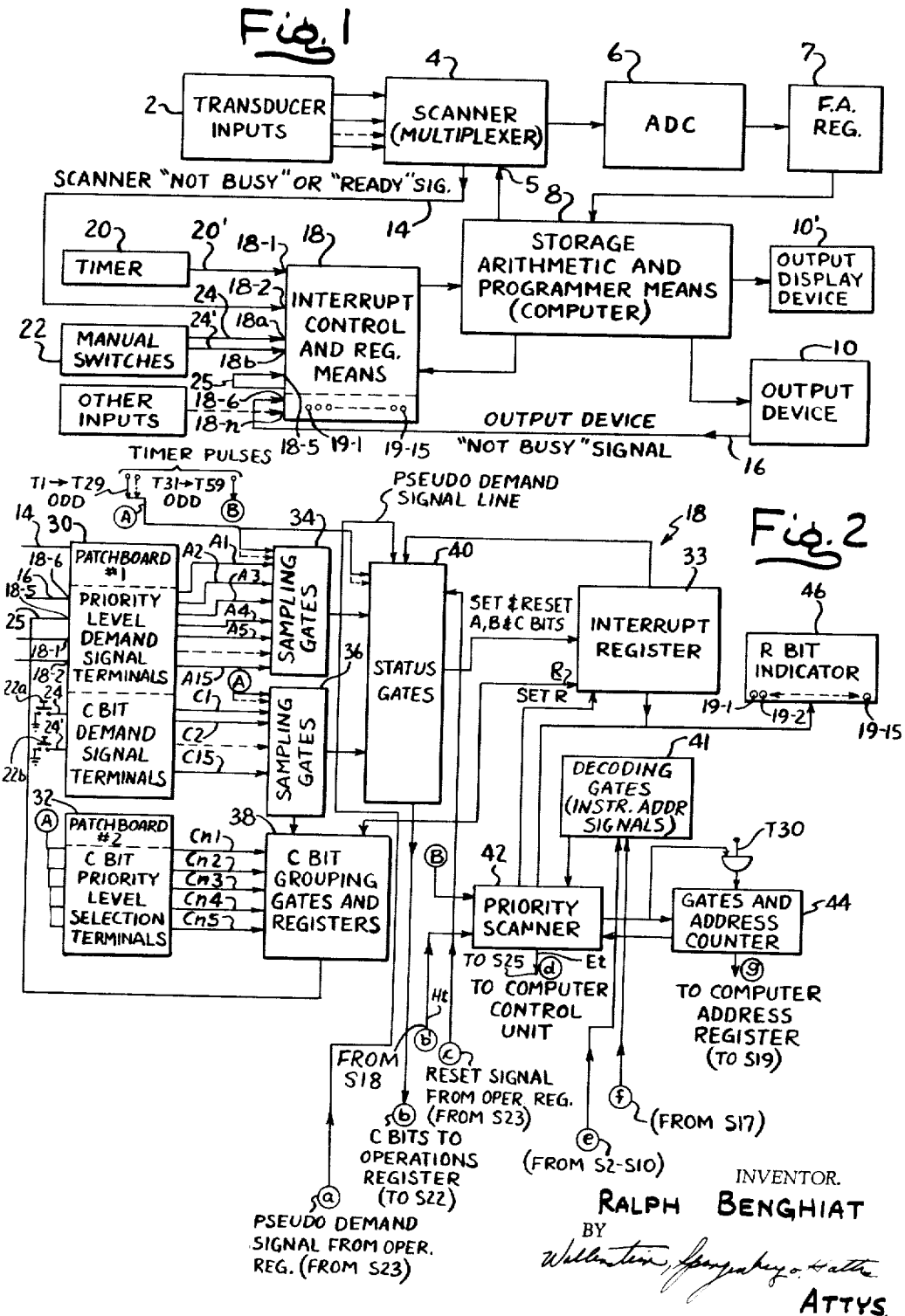

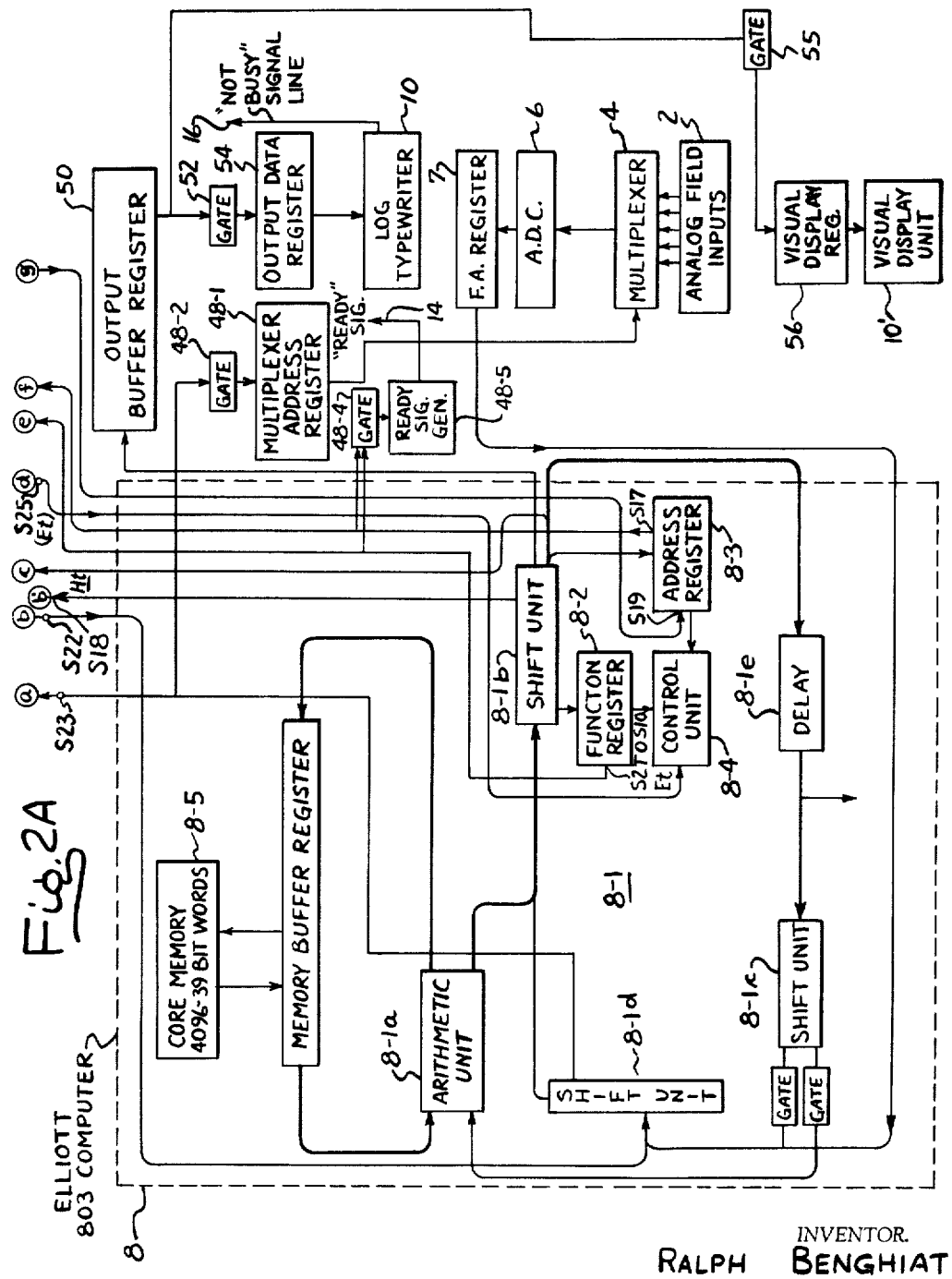

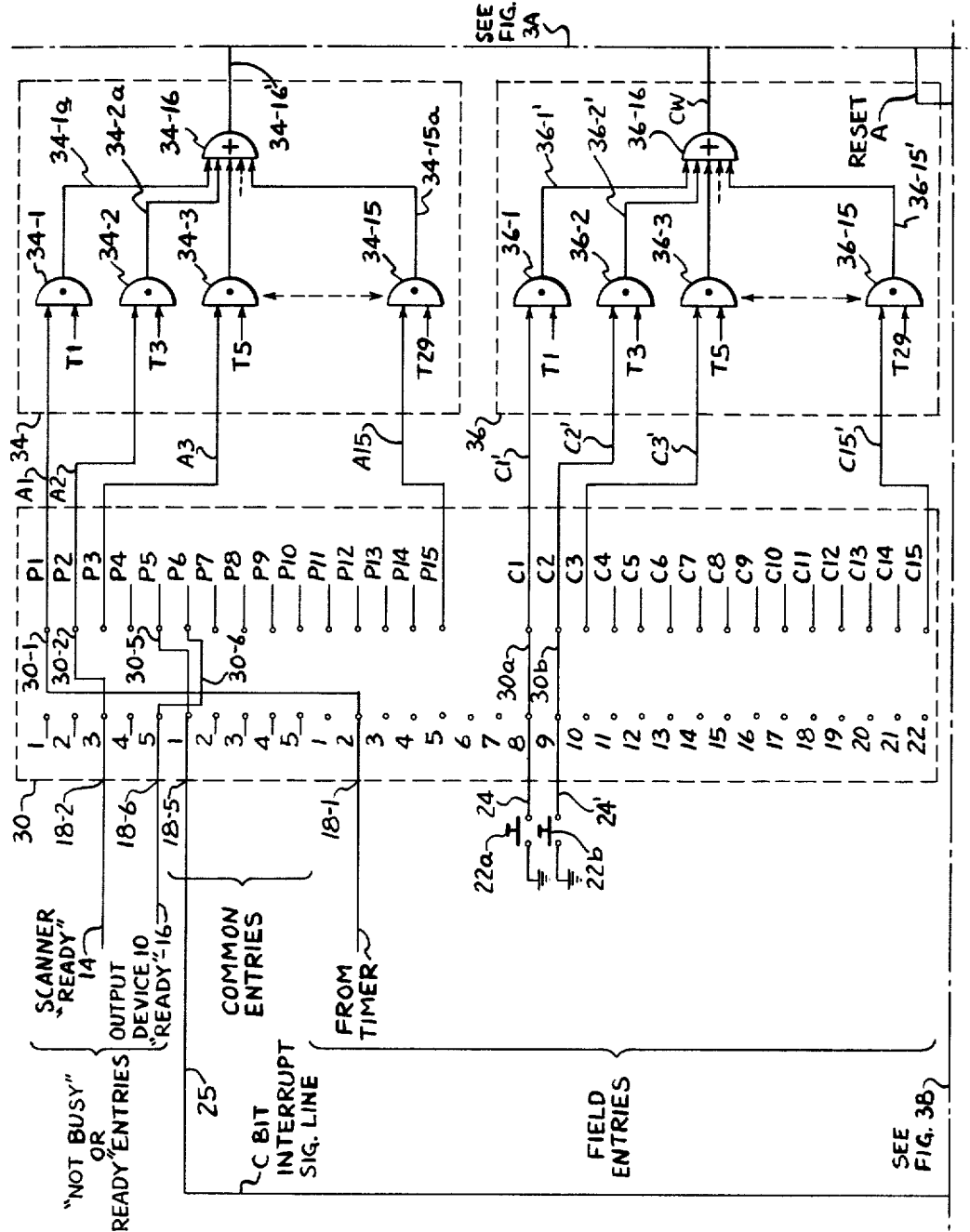

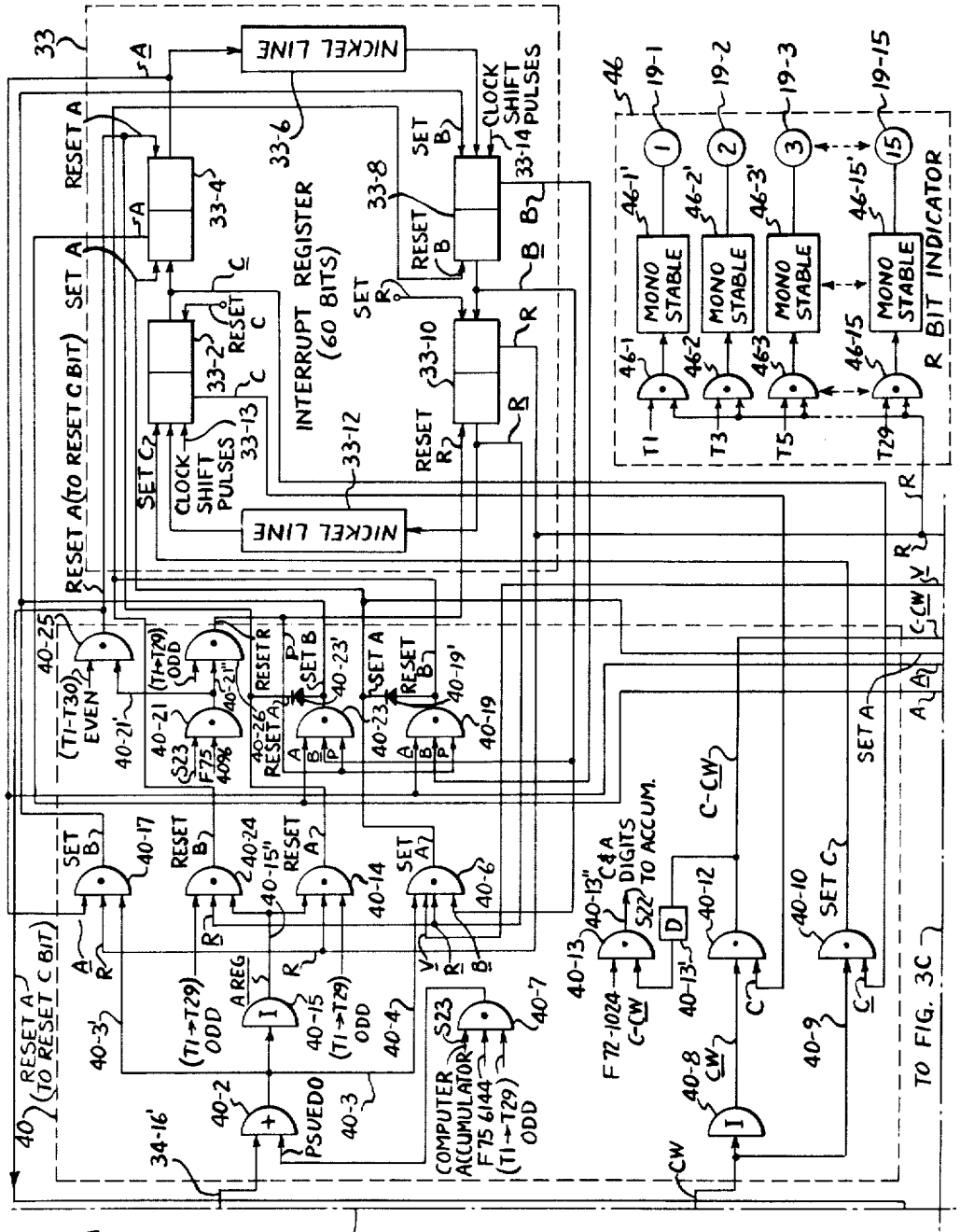

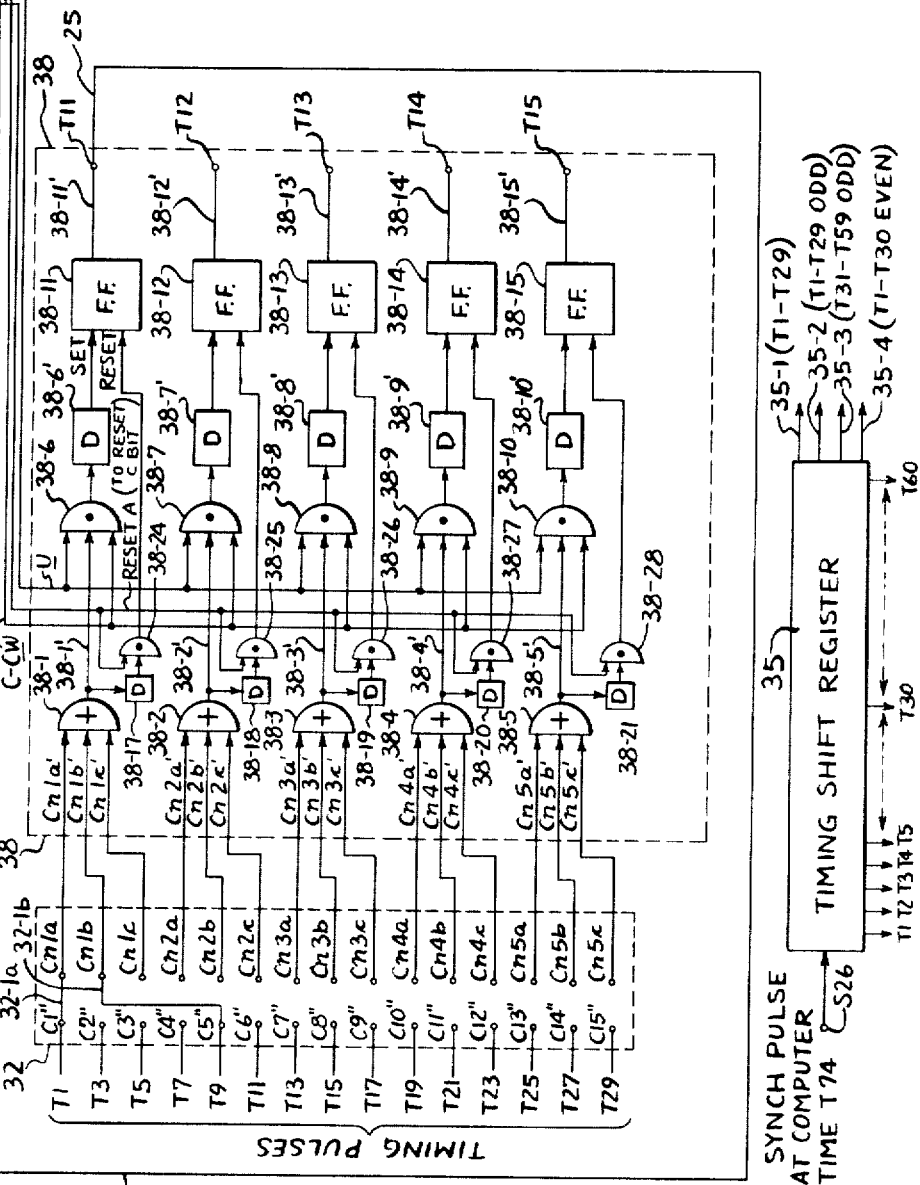

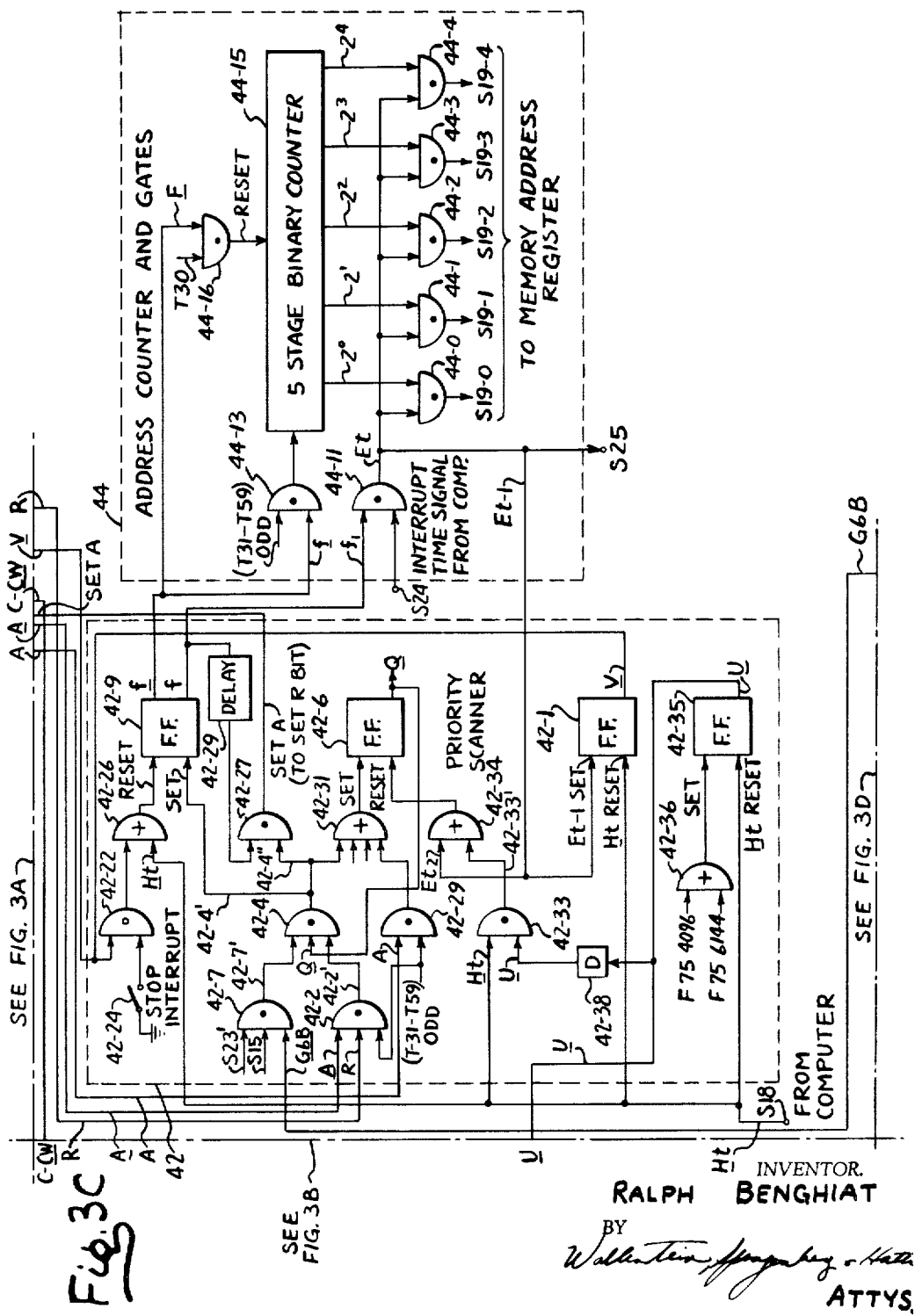

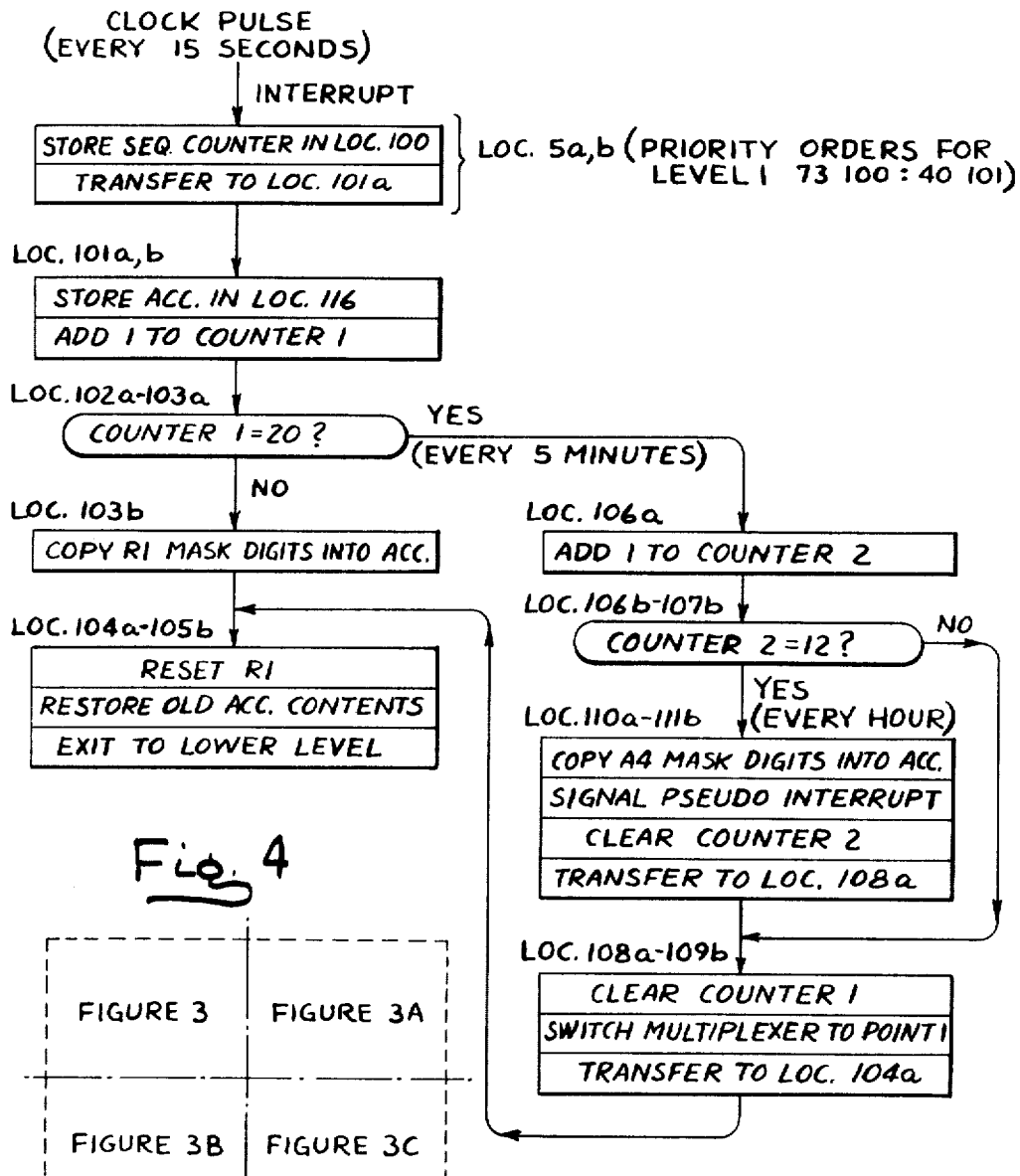
Fig. 13 LEVEL 1 CLOCK ROUTINE
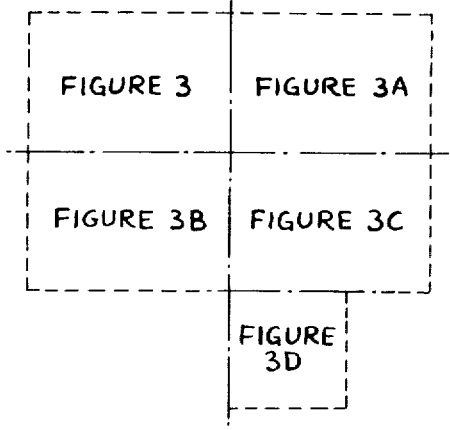
Fig. 4

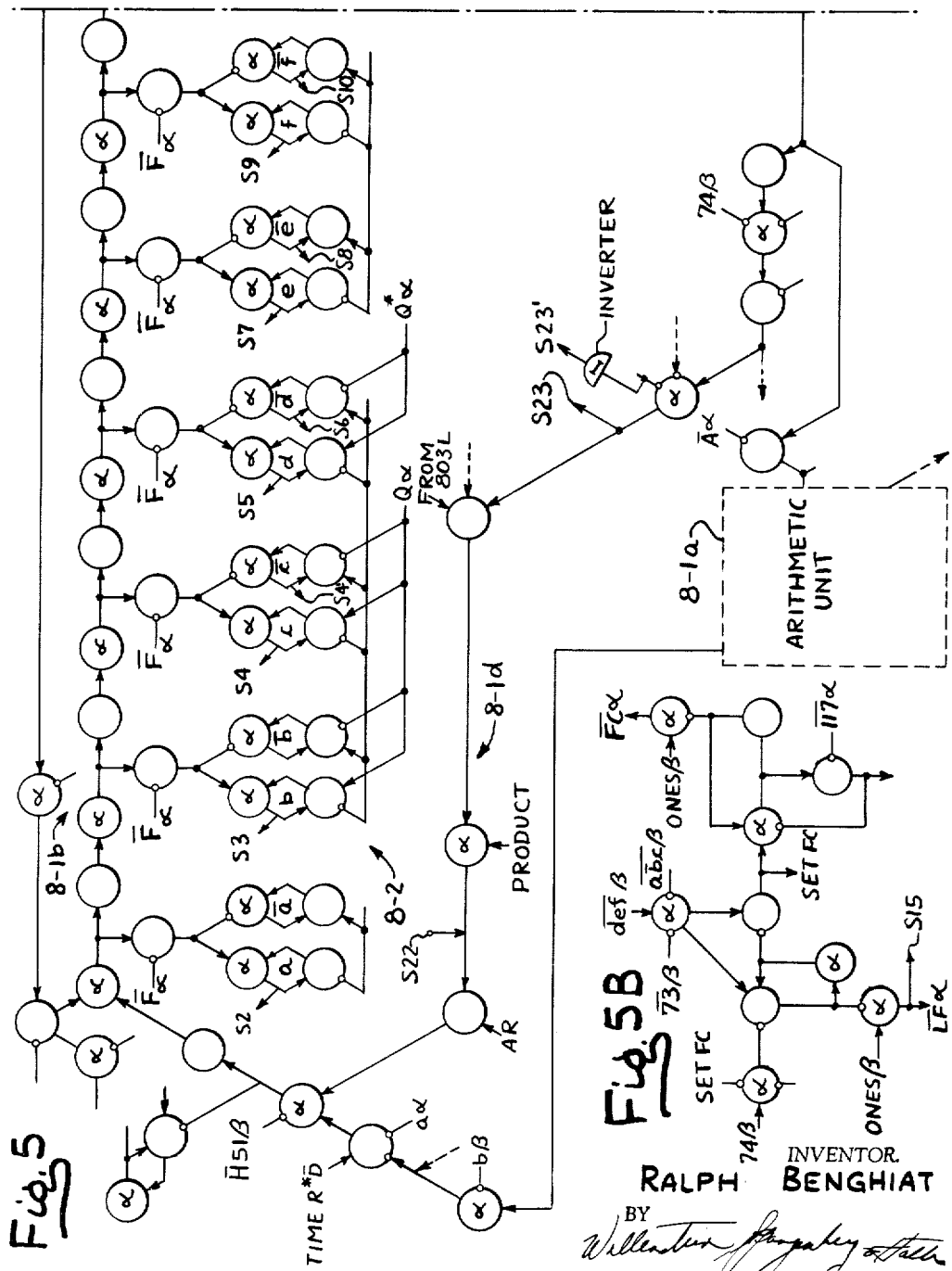

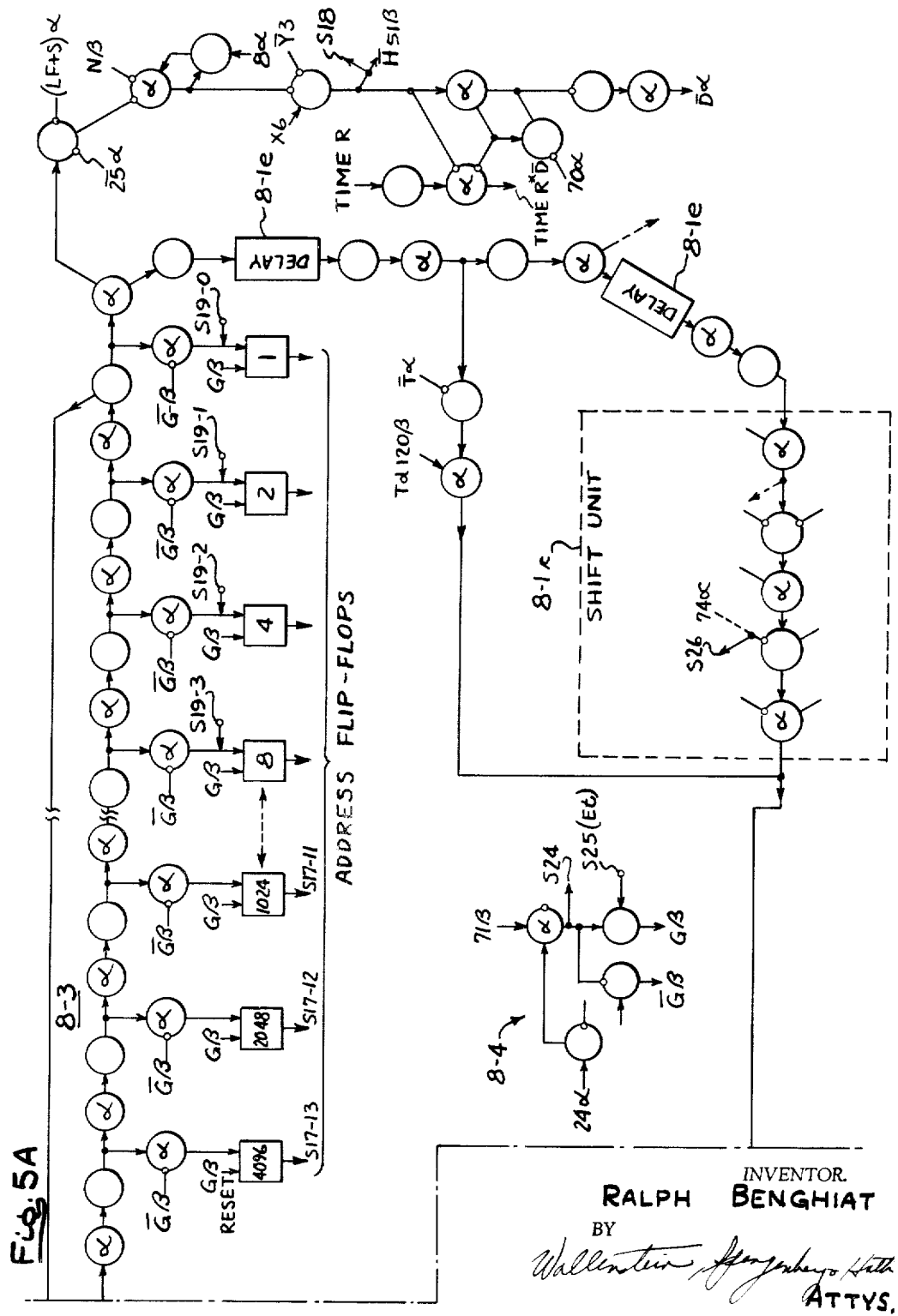

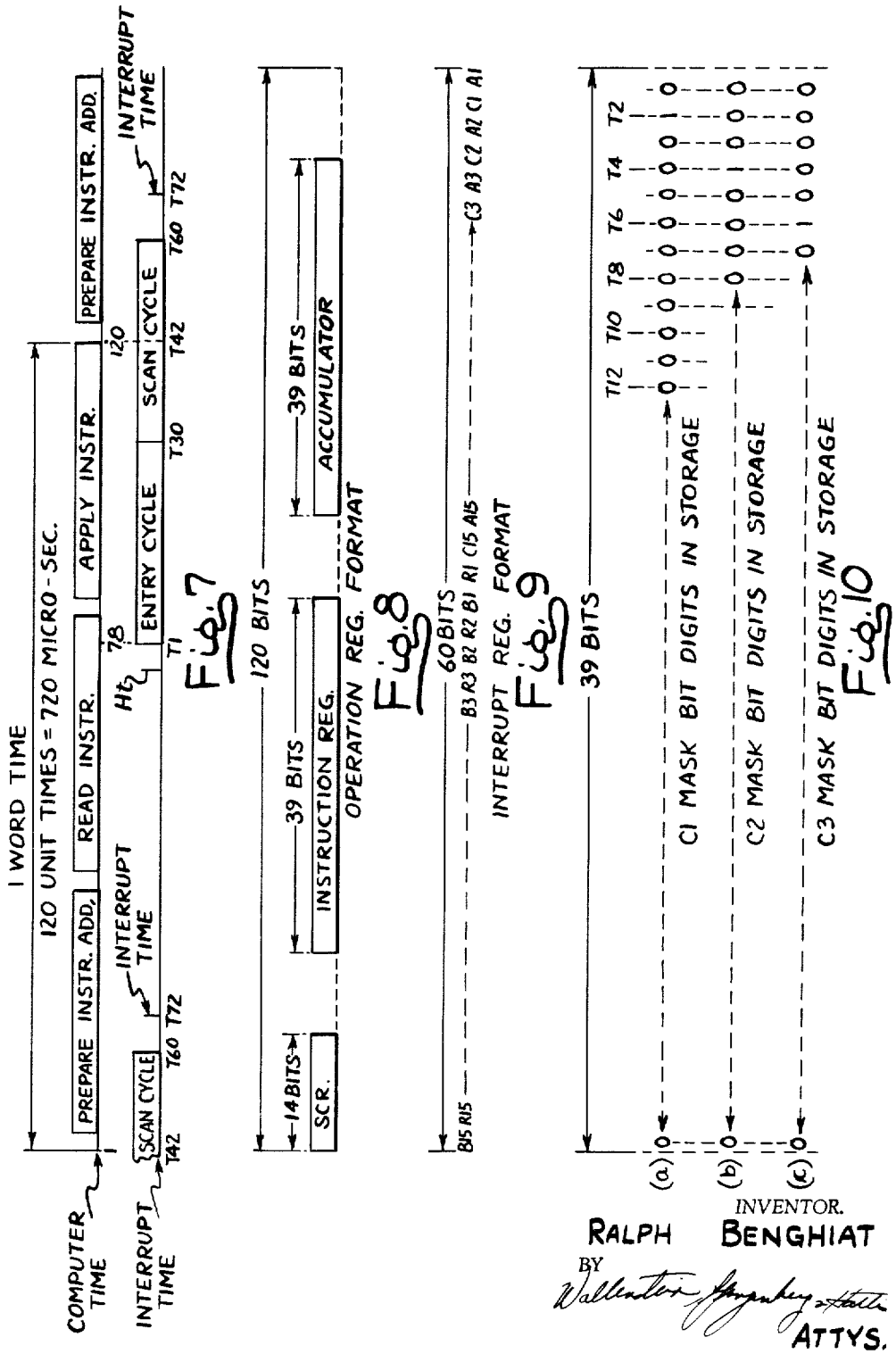

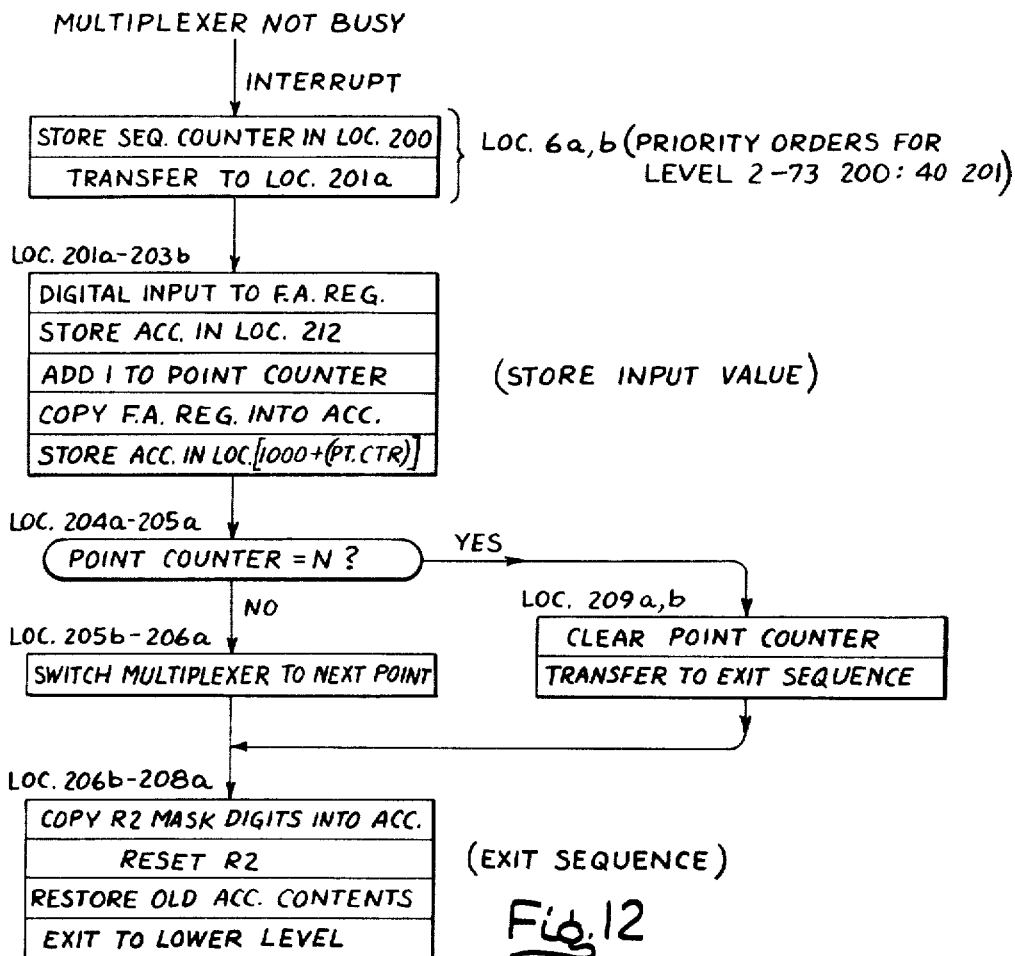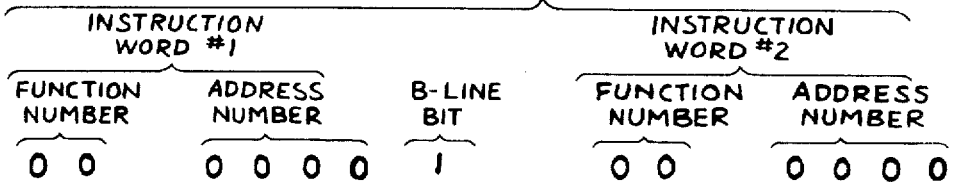

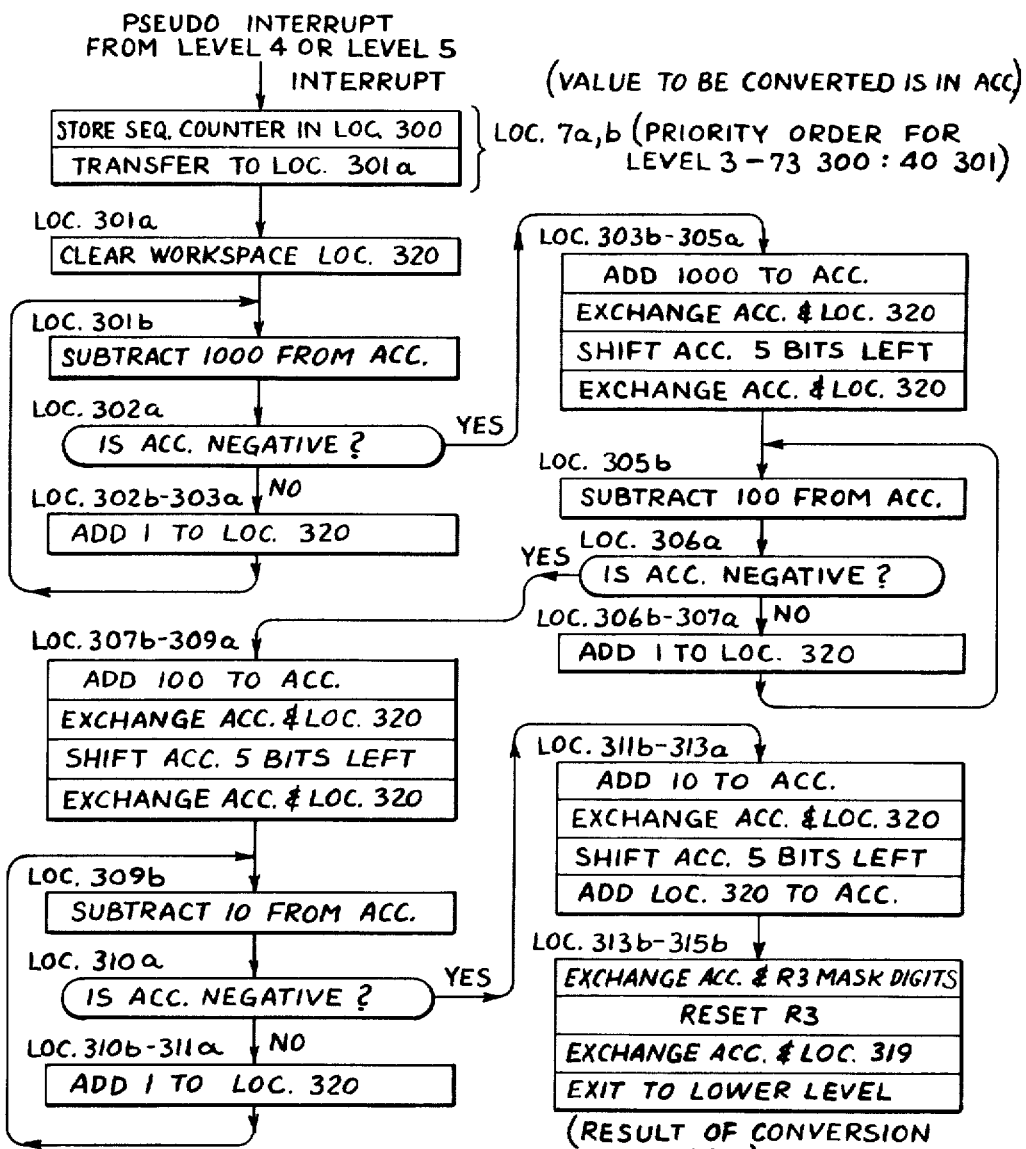

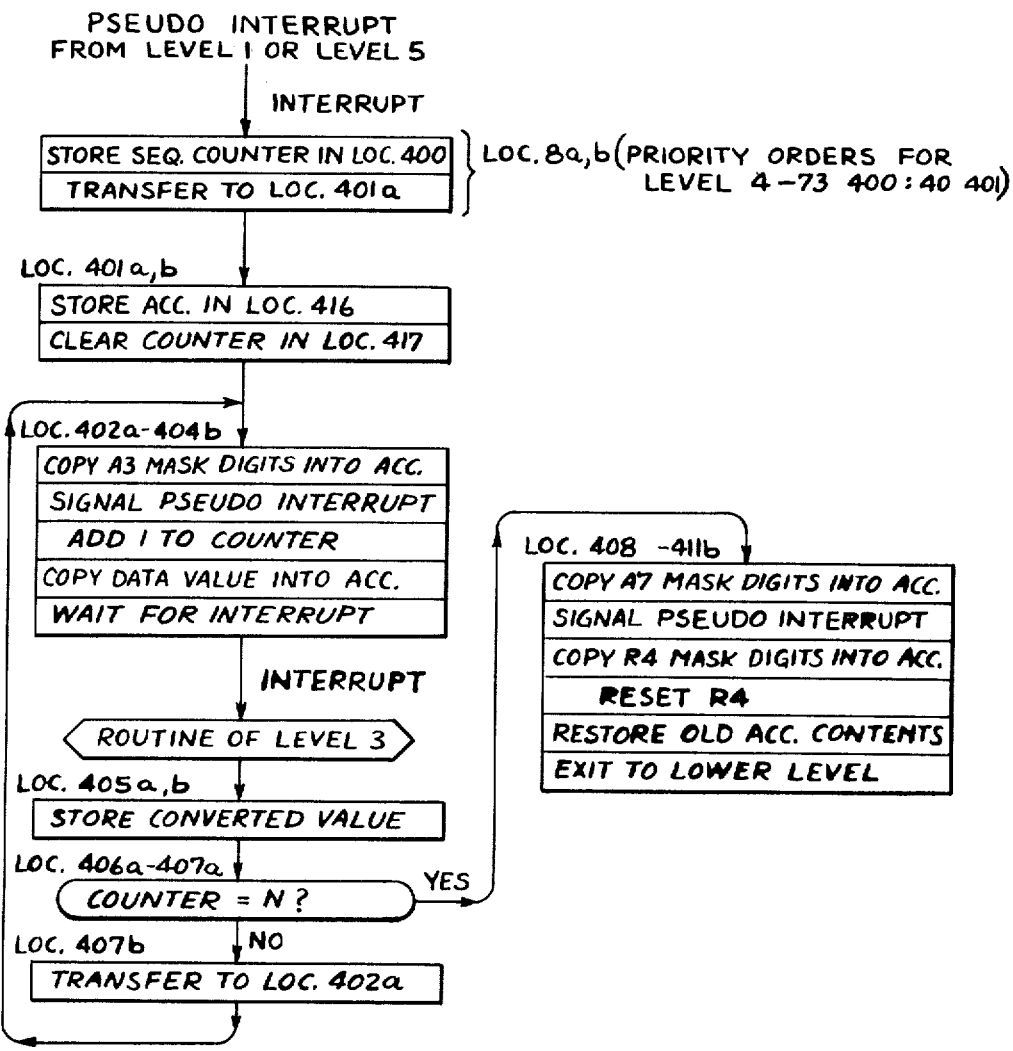
Fig. 16 LEVEL 4 - LOG DATA PREPARATION ROUTINE

Nov. 30, 1965  R. BENGHIAT  3,221,309
PRIORITY INTERRUPT MONITORING SYSTEM
Filed Aug. 10, 1961  16 Sheets-Sheet 16

Fig.17 LEVEL 5 - OPERATORS' REQUEST ROUTINE

LOC. 9a, b (PRIORITY ORDERS FOR LEVEL 5-73 500:40 501)

OPERATOR'S DEMAND PUSH BUTTONS → INTERRUPT

LOC. 501a,b: STORE SEQ.COUNTER IN LOC.500 / TRANSFER TO LOC. 501a

LOC. 501a,b: STORE ACC IN LOC. 530 / COPY INTERRUPT REG. INTO ACC.

LOC. 502a,b: C1 BIT = 0 ?
— YES →
— NO → LOC. 503a,b: RESET C1 / COPY A4 MASK DIGITS INTO ACC.

LOC. 504a-506b: SIGNAL PSEUDO INTERRUPT / COPY R5 MASK DIGITS INTO ACC. / RESET R5 / RESTORE OLD ACC. CONTENTS / EXIT TO LOWER LEVEL

LOC. 507a-508b: COPY C2 MASK DIGITS INTO ACC. / RESET C2 / CLEAR COUNTER IN LOC. 531 / CLEAR LOC. 3000

LOC. 509a,b: ADD 1 TO COUNTER / DATA VALUE TO ACC.

LOC. 510a,b: CONTENTS (3000-ACC) < 0 ?
— NO →
— YES → LOC. 513a-514b: NEW VALUE TO LOC. 3000 / COPY COUNTER INTO LOC. 3001

LOC. 511a-512a: COUNTER = N ?
— YES →
— NO → LOC. 512b: TRANSFER TO LOC. 509a

LOC. 515a-517b: COPY A3 MASK DIGITS INTO ACC. / SIGNAL PSEUDO INTERRUPT / COPY LOC. 3000 INTO ACC. / WAIT FOR INTERRUPT
→ INTERRUPT → ROUTINE OF LEVEL 3

LOC. 518a-520b: STORE CONVERTED DATA IN LOC. 3000 / COPY A3 MASK DIGITS INTO ACC. / SIGNAL PSEUDO INTERRUPT / COPY LOC. 3001 INTO ACC. / WAIT FOR INTERRUPT
→ INTERRUPT → ROUTINE OF LEVEL 3

LOC. 521a-522a: STORE CONVERTED NO. IN LOC. 3001 / COPY A8 MASK DIGITS INTO ACC.

INVENTOR.
RALPH BENGHIAT
BY
ATTYS.

ions of merely storing the data for future examination and use. In this, they differ fundamentally from most business and scientific data processing machines. For safety and efficiency, the industrial process monitoring system must be available at all times to attend to the needs of the process. However, some aspects of the invention have a more general application.

United States Patent Office 3,221,309
Patented Nov. 30, 1965

3,221,309
PRIORITY INTERRUPT MONITORING SYSTEM
Ralph Benghiat, Pacific Palisades, Calif., assignor to The Scam Instrument Corporation, a corporation of Illinois
Filed Aug. 10, 1961, Ser. No. 130,615
14 Claims. (Cl. 340—172.5)

This invention, in general, relates to industrial process monitoring systems or other systems wherein the system must examine and respond to input data as it arrives, instead of merely storing the data for future examination and use. In this, they differ fundamentally from most business and scientific data processing machines. For safety and efficiency, the industrial process monitoring system must be available at all times to attend to the needs of the process. However, some aspects of the invention have a more general application.

A typical present day industrial process monitoring system has an electronic computer system including arithmetic and memory sections. The memory section usually stores various data constants, such as high and low alarm or control limits, scale factors, and a multiplicity of program routines for carrying out different types of system operation demanded by the process being monitored, or by various external signal sources such as manual switches and the like. The arithmetic section carries out various arithmetic operations called for by the program, such as comparing the values of the process variables with the alarm or control limit values by a subtractive process which indicates whether an alarm or control function is to be carried out. One of the program routines may be a normal basic routine which includes the scanning of the various process variables and examining the variable values for alarm conditions. The basic routine may be momentarily interrupted or modified by the presence of various external signals calling momentarily for other program routines. The operation of one manual switch, for example, may call for a program routine which changes the data constants and the operation of another switch may call for a program routine which reads out the stored data values to a typewriter.

Where the monitoring system almost simultaneously receives a number of manual demands for different program routines, the question arises as to the order in which these demand signals are obeyed and the manner in which the currently active program routine is affected. If it is desired that all program routines be carried out in an order depending upon the relative importance or priority of the routines, the different routines may be assigned priority level numbers in accordance with their relative importance and the priority level number of a routine in progress compared with the priority numbers of the program routines whose operation have been demanded. The current program is immediately interrupted and replaced by the demanded program routine of a higher priority. The point of interruption of the interrupted program routine is recorded in memory so that it can be later resumed. After completion of all demanded program routines of higher priority, the interrupted program is resumed.

The present invention is a substantial improvement over the basic priority interrupt scheme just outlined by increasing the flexibility and scope of priority assignment, simplifying the program of the monitoring system, and greatly increasing the efficiency of utilization of input and output devices normally repeatedly used by the system.

In accordance with one aspect of the invention, certain program operations which are normally part of a larger program routine assigned to a single priority level are given independent priority status, even though they are not directly demanded by external demand signals. For example, a program sub-routine which is used in common with other program sub-routines is given an independent priority status along with the program sub-routines which use the common sub-routine. The common or shared routine is initiated by a program generated signal, referred to as a "pseudo" interrupt demand signal, which is treated by the monitoring system in the same manner as the aforementioned external or manual interrupt demand signals. It is important that the shared routine initially operated by a pseudo interrupt demand signal from one of the other routines be non-interruptable by the other routine or routines which share it. Otherwise, data developed by the common shared routine may be lost when interrupted by the latter routine. This problem is overcome by assigning the shared routine a priority level which is higher than the program routines which could demand its operation.

The provision of pseudo interrupt demand signals and the special program routines operated by them results in an overall program of the highest possible efficiency and flexibility. The pseudo interrupt demand signal generated in a program routine can be used not only to initiate an immediate interrupt to a program routine of higher priority as indicated in the above shared routine example, but it can also be used to initiate the later operation of program routines having a lower priority than the currently operated routine.

In accordance with another aspect of the invention, individual program routines are set up to be initiated by "not busy" or "ready" signals from various input or output devices used in the monitoring system so that the most efficient use of these devices may be had. For example, the scanner or multiplexer which scans the process variables are commonly provided with "ready" signal generating means for indicating to the computer when it is ready to transfer data to the computer or other input equipment such as an analog to digital converter. The "ready" signal is used as a priority interrupt demand signal in the same way as the other discussed priority interrupt demand signals so that the scanning routine is carried out immediately whenever the other demanded routines are of lower priority. Since one of the most important functions of a monitoring system is to detect alarm values of variables or variables which require special control functions, the prompt operation of the scanner becomes of extreme importance.

In accordance with still another aspect of the invention, the current activity of the program routines is visibly indicated by the energization of lamps or other visual indicating means assigned to the respective program routines. Since many of the routines are carried out in such a short time period that a lamp energized for such a period would not be visible, means are provided for extending the period of response of each alarm lamp somewhat beyond the time of occurrence of the program routine involved. The provision of these indicating lamps greatly facilitates the operator in his knowledge about the operation of the system. For example, program interrupt operations will be indicated by seemingly steady or prolonged light indications since the activation of the program routines is extended by interrupt operations. The activity of uninterrupted program routines are usually indicated by blinking lamps, that is lights which are energized only momentarily. This aspect of the invention has application to computer systems generally.

Where a large number of external program interrupt demand signals are involved, it may become impractical to assign each routine operated by a demand signal a different priority level. The presence of a very large number of demand signals and associated independent routines of secondary importance can encumber the speed of the monitoring system and unduly complicate the same. In accordance with another aspect of the invention, various program routines of secondary priority status and which could have independent priority status are grouped together in a single routine as sub-routines joined together by conditional transfer program steps which branch the program to a sub-routine or sub-routines called for by the external demand signals involved. The presence of the latter demand signals are stored and a single interrupt demand signal is generated which effects an interrupt operation to the common routine when it is the highest priority routine demanded by the system.

In addition to the various broad aspects of the invention just outlined, the invention has many specific aspects dealing with specific ways of carrying out these broad features. As will appear, some of these specific aspects have applications beyond the particular applications illustrated above. For example, one such aspect deals with a unique way for handling and storing information of the various external and internal interrupt demand signals, and for examining the stored information. The means for storing this information is referred to as an interrupt register. The interrupt register has provision for storing markers indicating momentary or persisting demand signals and successive demand signals. A routine demanded by a persisting demand signal is locked out after it completes one cycle of operation. Also, a routine which is activated but not completed by a momentary signal can be caused to operate a second time automatically at a later time by the presence of a second demand signal.

The above and other objects, advantages and features of the invention will become apparent upon making reference to the specification to follow, the claims and the drawings wherein:

FIG. 1 is a basic box diagram of a monitoring system incorporating the program interrupt system of the present invention;

FIGS. 2 and 2A together represent a more detailed box diagram of the system shown in FIG. 1;

FIGS. 3, 3A, 3B, 3C and 3D represent an exemplary circuit diagram of the program interrupt control and register means forming part of the system shown in FIGS. 2 and 2A;

FIG. 4 is a diagram illustrating the manner in which FIGS. 3, 3A, 3B, 3C and 3D can be arranged to form an integral circuit diagram;

FIGS. 5, 5A and 5B show core circuit diagrams of parts of an exemplary Elliott 803 computer to which the circuit of FIGS. 3, 3A, 3B, 3C and 3D make connection;

Figure 6:
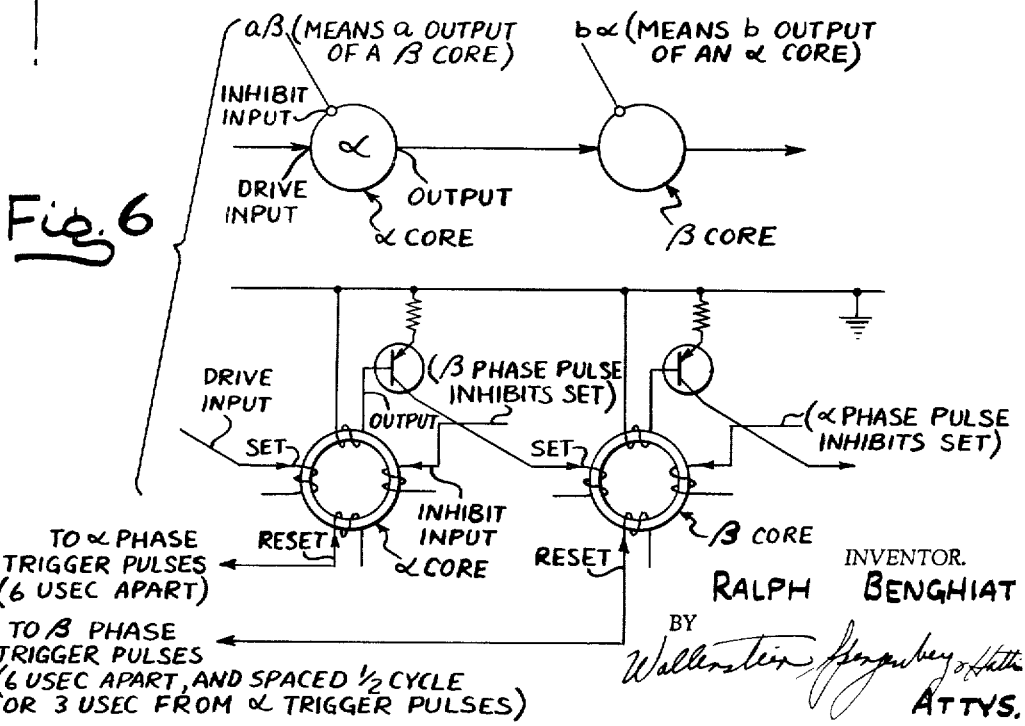
Figure 11:
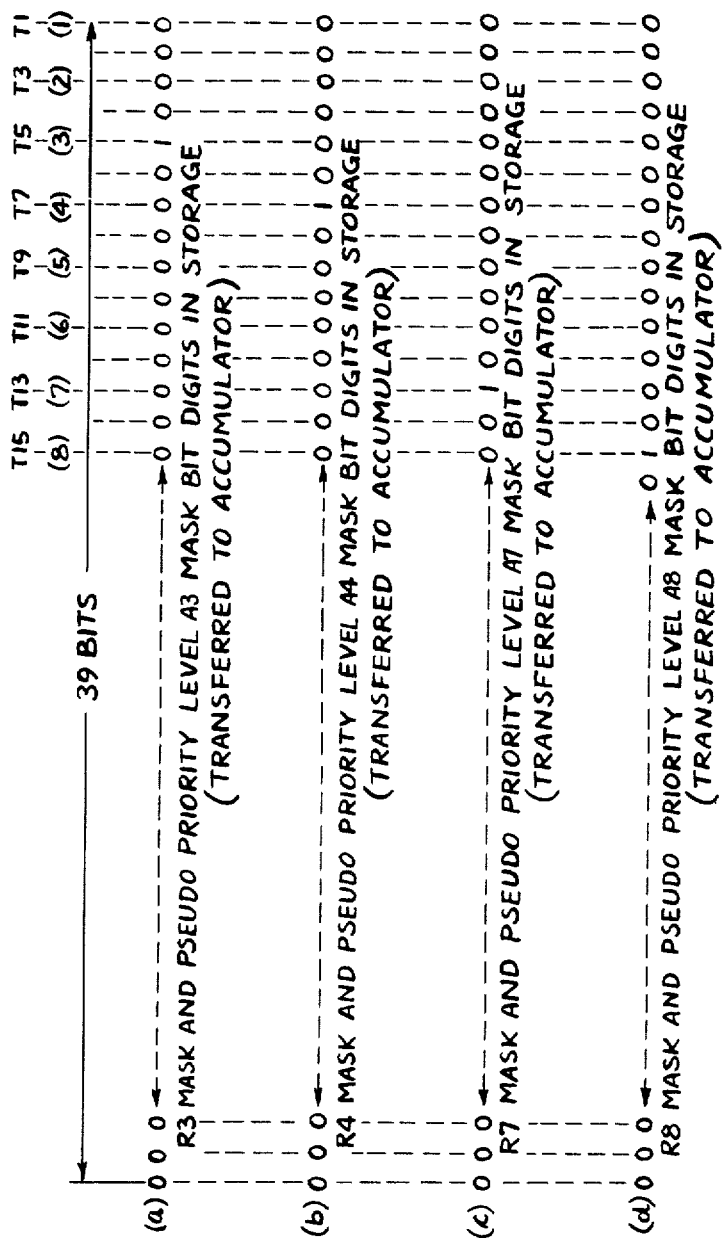

FIG. 6 identifies the various types of inputs to the core circuits of FIGS. 5, 5A and 5B;

FIG. 7 illustrates a timing diagram which relates to certain operations performed in the computer to certain operations performed in the program interrupt apparatus of the present invention;

FIG. 8 illustrates the types of information which circulates in the computer operations register;

FIG. 9 illustrates the arrangement of the bits of information stored in the interrupt register of the present invention;

FIG. 10 consisting of FIGS. 10(a), 10(b) and 10(c) shows the binary code format for the C mask bits stored in the computer memory and used to examine and reset the contents of the interrupt register;

FIG. 11 consisting of FIGS. 11(a), 11(b), 11(c) and 11(d) indicates the R mask bit and pseudo mask bit code group stored in the computer memory for resetting certain R bits in the interrupt register and for initiating pseudo demand signals for certain priority levels;

FIG. 12 shows the format of a typed instruction word group stored in the computer memory;

FIG. 13 is a flow diagram illustrating the clock routine which has been assigned priority level No. 1;

FIG. 14 is a flow diagram illustrating the multiplexer input routine which has been assigned priority level No. 2;

FIG. 15 is a flow diagram illustrating the binary to decimal conversion routine which has been assigned priority level No. 3;

FIG. 16 is a flow diagram illustrating the log data preparation routine which has been assigned priority level No. 4; and FIG. 17 is a flow diagram illustrating the operator's request routine which has been assigned priority level No. 5.

PART I—GENERAL DESCRIPTION

Refer now to FIG. 1 which illustrates the use of the present invention in connection with a system for monitoring process or other variables in a chemical or industrial process. The values of the various variables of the process may be detected by suitable transducer devices 2, such as thermocouples in the case of temperature variables. The individual electrical outputs of the transducers 2 are fed to the input of a scanner or multiplexer 4. The scanner 4 can take any one of a number of forms well known in the art, but is preferably an electronic diode matrix scanner well known in the art which can randomly select any transducer input in accordance with control signals fed to an input 5 thereof. The output of the scanner 4 is shown connected to the input of an analog to digital converter 6 which converts an analog input to a binary digital output in a well known manner. The output of the analog to digital converter 6 is fed to a register 7 in turn connected to the input of a storage, arithmetic and program means generally indicated by reference numeral 8. The storage, arithmetic and programing functions carried out by this portion of this system is commonly carried out by electronic computers. The exact form of the computer forms no part of the present invention although, to illustrate the use of the present invention, reference will be made to the model 803 computer manufactured by Elliott Brothers, Ltd. of London, England. A disclosure of the circuitry and mode of operation of this computer will not be disclosed or explained in any great detail in this application. However, such information is incorporated in a book in the Scientific Library of the Patent Office entitled "Handbook for the National-Elliott 803 Computer." Also, a block diagram of part of the computer 8 is shown in FIG. 8 and the core circuitry of those portions of the computer to which the interrupt apparatus of the invention is connected is shown in FIGS. 5, 5A and 5B.

Where an industrial process is being monitored, it is normally necessary for the safety of the equipment and personnel involved to continuously scan for variables which are in an abnormal unsafe range. The scanning operation should, therefore, have a relatively high order of priority on the use of the computer 8. However, numerous other operations are performed by the monitoring system other than scanning for abnormal variables, such as periodically feeding data on all the variables to an output device 10 which may be an electric typewriter. In other words, many demands are made on the computer 8 other than the demand for handling the signals obtained from the transducers 2. Since it takes the scanner 4 a certain finite time to get set to receive new information and to feed it to the analog to digital converter 6 or to switch from one point to another, the computer 8 may perform other functions while the scanner is getting set. Normally, a scanner is provided with means for generating a signal which indicates whether the scanner or multiplexer is ready to receive information from the transducer 2 and to transmit information to the analog to digital converter 6, such signal being fed to the computer 8 to prevent the coupling of the output thereof of the analog to digital converter, before it is connected or gated to the computer input. This signal is sometimes referred to as a "not busy" or "ready" signal. In FIG. 1, this signal is assumed to be present on a line 14 extending from the scanner 4. For similar reasons, the output device such as the typewriter 10 is frequently provided with means for signaling when the output device is busy or not busy, so that the computer 8 may utilize the output device when it is ready to be utilized and not at other times. In FIG. 1, this "not busy" signal is assumed to be fed from the typewriter 10 on a line 16.

In accordance with one aspect of the present invention, instead of connecting the "not busy" or "ready" lines 14 and 16 associated with the scanner 4 and output devices directly to the computer, these lines are connected to interrupt demand terminals 18–2 and 18–6 of an interrupt control and register means generally indicated by reference numeral 18. These "ready" signals along with other demand signals to be described are utilized to initiate respective program routines stored in the computer memory which are assigned different priority levels. Later on in the specification, an examplary detailed description will be given of a simplified scanning program routine initiated by the "ready" signal from the scanner 4 to illustrate the general manner in which the "ready" or "not busy" signals are handled. The exemplary monitoring system is one which is capable of handling demand signals for fifteen different levels of priority. The program routine initiated by the "ready" signal of the scanner 4 will be assigned the second highest priority level No. 2.

In the exemplary application of the invention to be described, the computer 8 is to respond to periodic timing signals generated by a timer 20 which, for example, are to be counted and stored in the computer memory, and at the appropriate time will initiate a program routine which prepares the scanned data for readout to the typewriter 10. These timing signals could, of course, be utilized for various other purposes also. The timer 20 has an output line 20′ connected to an interrupt demand input 18–1 of the interrupt control and register means 18 which signal will initiate operation of a program routine stored in the computer memory which handles this timing signal in a desired manner. This program routine must of necessity be given the highest priority level No. 1.

A number of manual demand switches generally indicated by reference numeral 22 in FIG. 1 are provided to initiate certain operations of the computer 8, such as preparing and feeding data stored in the computer memory to the typewriter 10, changing alarm set points, etc. In the exemplary form of the invention to be described these switches respectively initiate simplified program routines which prepare all the data values stored in the computer memory for readout to the typewrtier 10 and to select and prepare the highest data value stored in the computer memory for readout to an output display unit 10′. Lines 24 and 24′ extend from these manual switches to inputs 18a and 18b of the interrupt control and register means 18. It will be assumed that these switches will initiate operation of a single shared program routine stored in computer memory assigned priority level No. 5. This program routine will have separate sub-routines each for carrying out one of the switch operations referred to, if the associated switch is momentarily operated. The signals generated by the manual switches 22 are sometimes referred to as C bit demand signals. In the example of the invention to be described, up to fifteen different C bit demand signals can be grouped into various combinations. The drawings show three signals per group, each group sharing one of five possible priority levels. However, by adding additional circuits or chanels to the circuit to be described, all the C bit demand signals could share one or more routines. Only the operation of two C bit signaling switches sharing one priority level will be described in detail since this is sufficient to illustrate this aspect of the invention. The operation of any one C bit signaling means in each group is effective to generate an interrupt demand signal on a line 25 extending from the interrupt control and register means 18 and re-entering the same at an interrupt demand input 18–5. The interrupt control and register means 18 includes a register to be described for registering the presence of C bit demand signals as "C bit markers" so that, when a shared program routine is activated, the program routine can select by a conditional transfer program step particular program sub-routine or sub-routines which correspond to the C bit demand signal or demand signals which activated the shared program routine. The aforementioned register to be called the interrupt register also stores information as "A bit markers" on interrupt demand signal input terminals 18–1—18–15 which receive momentary or persisting interrupt demand signals. There are fifteen C bit marker positions C1 through C15 in the interrupt register for the aforesaid fifteen possible C bit demand signals and fifteeen A bit marker positions A1 through A15 for the aforesaid fifteen possible interrupt demand signals. The numbers 1 through 15 following the "A" refer to markers for priority levels 1 through 15.

The interrupt demand inputs of the interrupt control and register means 18 designated by reference numerals 18–1, 18–2, 18–5 and 18–6 are respectively connected to circuits which will record A bit markers for priority levels Nos. 1, 2, 5 and 6 respectively.

The priority interrupt demand signals may be simultaneously present on the interrupt signal input terminals 18–1, 18–2–18–n. The computer 8 cannot respond to all of the demand signals at the same time since it is capable of carrying out only one program step at a time. In order to utilize the various input signals to the device most efficiently, the computer 8 should respond to the interrupt demand signals in order of the importance or priority of the program routines which they activate. If the computer 8 is carrying out a given program routine assigned a given priority level which is lower than the priority level of any other demanded routine, the current routine should be interrupted so that the higher priority level routines called for can be carried out first. To this end, the interrupt control and register means 18 has stored therein information as R bit markers which indicate the priority level of program routines in progress and also of program routine or routines which have been interrupted and not yet completed. The R bit marker for priority level No. 1 is referred to as the R1 bit marker, the R bit marker for priority level No. 2 is referred to as the R2 priority bit marker and the R bit marker for the remaining levels are respectively referred to as the R3, R4 . . . R15 markers. These markers are reset, that is removed, when their routines are completed. The interrupt register and control means also stores C1 through C15 and B1 through B15 bit markers which respectively indicate the C bit demand signals which have not yet effected a program interrupt operation and the presence of successive or persistent interrupt demand signals in conjunction with the associated R bit markers. Interrupt and lock-out operations are controlled by these markers in a manner to be described later on in this specification.

In accordance with still another aspect of the present invention, the interrupt register and control means 18 control the energization of R bit indicator lamps 19–1 through 19–15 to indicate the presence of program routines which have been activated but which are not yet completed.

In addition to the various program routines which are operated directly by the interrupt demand signals on the terminals 18–1, 18–2, etc., other program routines are set up which are initiated by signals generated within the computer 8, which signals are referred to as pseudo interrupt demand signals. The pseudo interrupt-responsive routines are assigned distinctive priority levels. These priority interrupt signals effectively establish links between various program routines and are handled by the interrupt control and register means 18 in the same way as are the other interrupt demand signals fed to the terminals 18–1, 18–2, etc. The provision of pseudo interrupt signals establishes substantial simplification and flexibility in programing. For example, routines can be set up which are used in common by other routines and to safeguard various intermediate results obtained by the common routine, the shared routine is given a higher priority level than any of the routines which demand its operation. In the exemplary form of the invention to be described, a common shared routine has been assigned priority level No. 3 and the routines which demand its operation have been assigned priority levels Nos. 4 and 5. The program routine which has been assigned priority level No. 5 is the one operated by the C bit manual switches 22.

When the computer 8 is idling, that is, when no interrupt demand signals are present, the computer will automatically carry out some basic routine assigned the lowest priority level. No interrupt demand signal is necessary to enter this routine and no A, R, C or B bit markers are associated with this routine.

Tables I and IA illustrate various program routines which will be referred to in describing the operation of the present invention, the nature of the signals which initiate these routines, and the broad functions carried out thereby.

In accordance with still another aspect of the present invention, when an interrupt demand signal persists after the program routine demanded by it has been completed, the routine is "locked out" and cannot be re-activated until the interrupt demand signal disappears and is re-established again. The presence of a B bit marker and the absence of a corresponding A and R bit marker will cause a lockout operation of the routine involved. (Lockout of C bit shared routine is not permitted for reasons to be explained.) Whenever a routine is completed, if an interrupt demand is still present, the associated A bit marker involved is removed and a B bit marker is set which prevents the demand signal involved from effecting a subsequent interrupt operation. When the demand signal involved disappears, the associated B bit marker is automatically removed to permit an interrupt operation when the interrupt demand signal is later re-established.

The problem of lockout is avoided in part in the case of routines demanded by C bit interrupt demand signals because C bit demand signals are not effective to set corresponding A bit markers until the C bit demand signals disappear. If the C bit demand signals resulted in A bit markers during their occurrence, the persistence of one C bit signal could prevent operation of the shared routine by the other associated C bit demand signal. The absence of lockout of a C bit initiated routine is prevented also by other features of the invention to be explained later on in the specification.

In accordance with still another aspect of the present invention, the disappearance and re-establishment of an interrupt demand signal other than a C bit interrupt demand signal during the activation of a program routine will set a corresponding B bit marker instead of an A bit marker which, upon completion of the routine, will set another A bit marker to effect another interrupt operation.

Table II summarizes the various combinations of A, B and R bit markers to which the monitoring system of the invention responds and the meaning of these combinations.

PART II—SPECIFIC DESCRIPTION

(a) Patchboard 30

Although the interrupt control and register means indicated by box 18 in FIG. 1 may take a variety of forms, and could even be partially, at least, incorporated in the computer itself, it is preferred that it have the features illustrated in the circuit diagram of FIGS. 3 and 3A. To

*Table II*

| A | B | R | |
|---|---|---|---|
| 0 | 0 | 0 | No demand, level not active. |
| 1 | 0 | 0 | Demand marked, level not active. |
| 1 | 0 | 1 | Level activated, demand signal persists. |
| 0 | 0 | 1 | Level activated, demand signal removed. |
| 0 | 1 | 1 | Level activated, second demand marked. |
| 0 | 1 | 0 | Activity completed, demand signal persists. |
| 1 | 1 | 0 | Cannot occur. |
| 1 | 1 | 1 | Cannot occur. |

*Table I*

| Priority level | Interrupt demand signals | Functions |
|---|---|---|
| (1) Time responsive routine | External demand signal every 15 seconds | Counts time pulses. |
| (2) Multiplexer input routine | Demanded by signal that multiplexer is not busy. | (1) Reads a multiplexer input. (2) Processes and stores data. (3) Counts number of readings. |
| (3) Binary to decimal conversion routine | (1) Pseudo interrupt from level 4. (2) Pseudo interrupt from level 5. | Converts binary numbers to decimal form for output. |
| (4) Log data preparation routine | (1) Pseudo interrupt from level 1 every hour. (2) Pseudo interrupt from level 5 if externally demanded. | Processes stored data for output every hour or when demanded. |
| (5) Operators' requests routine | (C bits produced by manual switches: C1=Demand log. C2=Find and convert largest value. | Examines C bits. If C1, then transfers to log routine. If C2, then performs search for highest value. |
| (7) Printer output routine | Pseudo interrupt from level 4 | Output routine to output device 10 (Typewriter). |
| (8) Visual display output routine | Pseudo interrupt from level 5 | Output routine to output device 10' (Visual display). |
| (6), (9) through (15) | Not used | |
| (16) Basic routine | None | Computer idles when no interrupt is demanded. |

*Table IA*

| Priority level | Programmed demands for other levels |
|---|---|
| (1) Time responsive routine | (1) Initiates multiplexer busy every 5 minutes. (2) Causes pseudo interrupt to level 4 every hour. |
| (2) Multiplexer input routine | If number of readings has not reached stored limit, then initiates multiplexer busy. Otherwise exits, Locking out level 2. |
| (3) Binary to decimal conversion routine. | None. |
| (4) Log data preparation routine | Causes pseudo interrupt to level 3 pseudo interrupt to level 7 for output. |
| (5) Operators' requests routine | (1) Causes pseudo interrupt to level 4 If C1 bit is present. (2) Causes pseudo interrupt to level 3 for conversion. Then pseudo interrupt to level 8 for output. | aid in understanding the circuitry there shown, a detailed box diagram of the interrupt control and register means 18 is shown in FIG. 2 which indicates the functions of various sections of the circuit, the portions represented by the boxes in FIG. 2 being indicated by dashed boxes in FIGS. 3, 3A, 3B, 3C and 3D. Also, the interconnection between the interrupt control and register means 18 and the Elliott 803 Computer 8 are shown by identically designated connecting points in FIGS. 3, 3A, 3B, 3C and 3D, and FIGS. 5, 5A and 5B showing only a part of the Elliott Computer disclosed in said "Handbook for the National—Elliott 803 Computer."

Figure 3D:
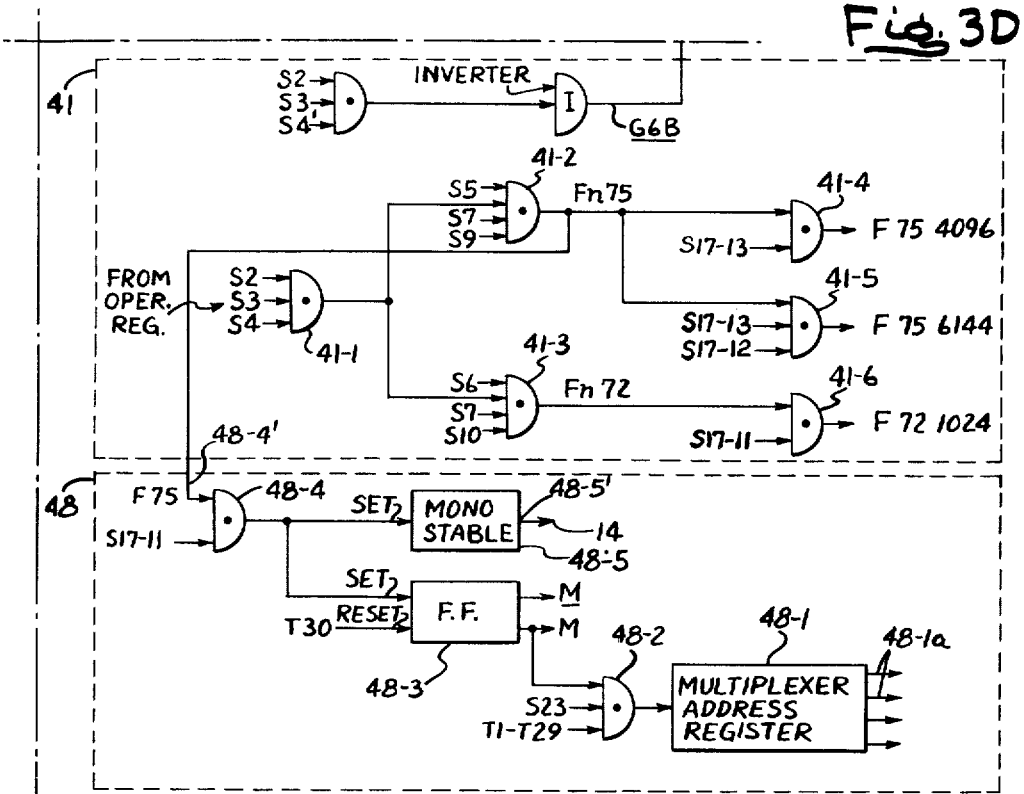

The input circuit of the interrupt register and control means 18 includes a patchboard 30 (FIG. 3). The patchboard 30 has a left hand column of terminals to which the interrupt demand signaling means are connected, and a right hand column of terminals which may be permanently wired to various portions of the circuitry to be described. For convenience to the operator in setting up the patchboard 30, the left hand column of terminals are arranged in different groups. An upper group of five terminals Nos. 1 through 5 are set aside for "ready" or "not busy" interrupt demand signals. Accordingly, the scanner "ready" signal input line 14 is connected to terminal No. 3. The line 14 extends from a multiplexer control circuit 48 (FIG. 3D) to be described in detail later on in the specification. The "not busy" signal line 16 of the output device 10 extends to the No. 5 terminal of the "not busy" signal terminals. A second group of terminals Nos. 1 through 5 is provided for the C bit (or common entry) interrupt demand signals which initiate five different program routines assigned five different priority levels. The interrupt signal line 25 associated with the C bits to be assigned to the switches 22 is shown connected to the No. 1 terminal of the common entry terminals. The remaining terminals Nos. 1-22 in the left hand column of terminals referred to as field entry terminals are for external demand signals originating outside of the computer 8 and the interrupt means 18 other than the "ready" or "not busy" interrupt demand signals. Accordingly, the output line from the timer 20 is shown connected to the No. 2 terminal of the field entry terminals and manual pushbutton switches 22a and 22b constituting C bit signaling means are respectively connected to the No. 8 and No. 9 field entry terminals.

The right hand set of terminals of the patchboard 30 includes a first set of fifteen priority level terminals P1 through P15 and a lower set of fifteen C bit terminals C1 through C15. The upper group of terminals P1 through P15 are for respectively setting up the aforesaid fifteen different priority levels by jumpers applied by the operator between these terminals and the left hand column of terminals except for those connected directly to C bit signaling means. Thus, the timer interrupt demand signal is caused to operate the program routine assigned priority level No. 1 by a patchboard connection 30-1 extending between the No. 2 field entry terminal and the P1 terminal of the patchboard. Similarly, the scanner "ready" signal initiates the program routine having the second highest priority by a patchboard connection 30-2 extending between the No. 3 "not busy" terminal and the P2 terminal. A patchboard connection 30-6 extends from the No. 5 "not busy" terminal associated with the "not busy" input line from the output device 10 to the sixth priority level terminal P6.

The field entry terminals connected to the C bit signaling means, such as the manual switches 22a and 22b, are not connected directly to the priority terminals P1 through P15. Rather, they are connected by patchboard connections like 30a and 30b to the C bit terminals C1 through C15 which lead to circuitry to be described which set up C bit markers. The C bit signaling means which is to set a C1 bit marker is connected to the C1 terminal, as is the manual switch 22a. The manual switch 22b which is to set up a C2 bit marker is connected by a patchboard connection 30b to the patchboard terminal C2. As previously indicated, the line 25, which has an interrupt demand signal fed thereto when either or both switch 22a or 22b is operated and then released, is connected to priority level terminal P5 by a patchboard connection 30-5.

(b) *Interrupt register 33*

The presence of C bit demand signals on the C bit terminals C1 to C15 respectively result in the storing of corresponding C bit markers in an interrupt register 33 (FIG. 3A) forming part of the interrupt register and control means 18, and the presence of interrupt demand signals on the priority level terminals P1 to P15 respectively result in the storing of corresponding A bit markers in the register 33. As illustrated, the register 33 is a circulating register comprising two pairs of bistable shift register elements 33-2 and 4 and 33-8 and 10 separated by nickel delay lines 33-6 and 33-12. The circulating register is designed to handle sixty bits of binary information which continuously circulate in the register. The information bits are shifted in the bistable shift register elements 33-2, 33-4, 33-8 and 33-10 by means of clock shift pulses fed into one or more shift lines 33-13 and 33-14. These clock shift pulses which are available in the Elliott 803 Computers are generated each basic time unit which is six micro-seconds in the Elliott 803 Computer. Each clock pulse shifts information in the associated bistable elements one position in the circulation interrupt register. One hundred and twenty (120) such unit times represent one word time of the Elliott computer.

The first fifteen bits of information circulating clockwise in the interrupt register are the A and C bit markers arranged alternately in the manner shown in FIG. 9, namely the A1, C1, A2, C2, A3, C3–A15 and C15. The next fifteen bits circulating in the interrupt register are the R and B bits arranged thusly: R1, B1, R2, B2, R3, B3–R15 and B15. For the purposes of explaining the operation of the interrupt register of the present invention, it should be understood that at every word time of the computer during a time period referred to as an entry cycle and lasting thirty time units (T1 through T30) information is gated into the interrupt register 33. The next thirty time units T31 through T60 are devoted to what is referred to as a scan cycle where the information in the interrupt register is scanned to determine whether an interrupt of the current program is required. In terms of computer time, time T1 for the interrupt apparatus is actually time T78 for the computer and, unless otherwise stated, the reference to timing is in terms of interrupt rather than computer time. FIG. 7 illustrates the relative timing of the entry and scan cycles and certain operations carried out by the computer.

At time T1, the A1 and C1 markers will respectively be entered in the shift register elements 33-4 and 33-2 by feeding a "1" binary state signal to the "set A" and "set C" inputs of the shift register bistable elements 33-4 and 33-2. The shift register bistable element 33-4 has an "A" output line and an "$\underline{A}$" output line. When a marker is present in this bistable element, it will be assumed that the "A" output will have a "1" binary state signal thereon and the $\underline{A}$ output line will have a "0" binary state signal thereon. If no marker is set in this bistable element, the output lines A and $\underline{A}$ will respectively be in a "0" and "1" binary state. The shift register bistable elements 33-2, 33-10 and 33-8 respectively have pairs of output lines C–$\underline{C}$, R–$\underline{R}$ and B–$\underline{B}$. The underlined output lines $\underline{C}$, $\underline{R}$ and $\underline{B}$, as in the case of output line $\underline{A}$, will have "1" and "0" binary state signals thereon when a marker is respectively absent and present in the associated bistable elements. The C, R and B output lines have opposite binary state signals than their underlined companion output lines. At time T1 and every odd time T3, T5, etc. up to time T29 the binary signals on the output line pairs A–$\underline{A}$, C–$\underline{C}$, R–$\underline{R}$ and B–$\underline{B}$ will indicate the presence or absence of the correspondingly identified $A(n/2+\frac{1}{2})$, $C(n/2+\frac{1}{2})$, $R(n/2+\frac{1}{2})$ and $B(n/2+\frac{1}{2})$ markers (n is 1, 3, 5, 7, etc. for times T1, T3, T5, T7, etc.). The delay lines 33-6 and 33-12 each inserts a 28 time unit delay so that the presence or absence of A, C, R and B bit markers at the odd times T31 to T59 during the scan cycle will be indicated by the output conditions of the bistable elements at the opposite side of the circulation register, namely respectively by the output line pairs R–$\underline{R}$, B–$\underline{B}$, A–$\underline{A}$ and C–$\underline{C}$. The bistable elements 33-10 and 33-8 respectively have "set R" and "set B" lines which set markers in the associated bistable elements when "1" binary state signals are fed thereto. The bistable elements 33-4, 33-2, 33-10 and 33-8 respectively have reset C, A, R and B lines which reset or remove the markers stored in the associated bistable elements when "1" binary state signals are fed thereto.

(c) *Interrupt demand signal sampling gate circuit 34 (FIG. 3)*

Connecting lines A1, A2, A3–A15 respectively extend from priority level terminals P1 through P15 of the patchboard 30 to respective "and" gates 34–1, 34–2, 34–3—34–15 of a sampling gate circuit 34. Time pulse lines T1, T3, T5–T29 respectively extend to the "and" gates 34–1, 34–2, 34–3—34–15. The aforesaid time pulse lines respectively extend from correspondingly identified outputs of a timing shift register 35 (FIG. 3B) synchronized by a timing pulse fed from the computer 8 on a line S26. The pulse occurs at computer time T74. Outputs T1, T2, T3–T60 are taken from the different stages of the shift register to provide timing pulses respectively at interrupt times T1 to T60. A common connection 35–1 is also made to all the outputs T1 to T29 to provide on one line pulses at times T1 to T29. A common connection 35–2 is also made to all the odd numbered outputs T1, T3, T5, etc. between times T1 to T30 to provide on a single line all the odd time pulses during each entry cycle. A similar connection 35–4 connected to all the even numbered outputs T2, T4, T6, etc. between times T1 to T30 to provide on a single line all the even time pulses during each entry cycle. A last common connection 35–3 is made to all the odd numbered outputs T31, T33, T35, etc. between times T31 to T60.

If an interrupt demand signal is present on line A1 extending to the "and" gate 34–1 at time T1, a T1 timing pulse will open the gate to pass the interrupt demand signal to output line 34–1a of the gate. Likewise, at time T3, if an interrupt demand signal is present on the line A2, the gate 34–2 will be open to provide an interrupt signal to output line 34–2a of the gate. In effect, the gates 34–1, 34–2 . . . 34–15 scan the priority level terminals P1 to P15 at the odd times during each entry cycle to determine the presence or absence of priority interrupt demand signals thereon. The outputs of the "and" gates 34–1 . . . 34–15 respectively extend to an "or" circuit 34–16 which provides a signal at the output thereof whenever an input signal is present on any of the input lines referred to. The output of the "or" circuit 34–16 extends to one of the inputs of a second "or" circuit 40–2 forming part of a status gate circuit 40 (FIG. 3A).

(d) *Pseudo interrupt demand signals and setting of A bit markers*

As previously indicated, some of the priority levels are activated by pseudo interrupt demand signals which are generated by the program stored in the computer 8. In a manner to be explained, when a particular program routine calls for a pseudo interrupt to a particular level, a time signal will be generated at a time corresponding to the priority level of the routine to be activated. As previously indicated, time signals T1, T3, T5, etc. are utilized for gating interrupt signals connected to the priority level terminals P1 to P15. For program routines to be initiated only by pseudo interrupt signals, the priority level terminals corresponding to the priority levels of these routines are not connected to the input side of the patchboard 30 and so are inactive or unused. To initiate by pseudo interrupt a program routine having a priority level $n$, the computer program generates a time signal at time $2n-1$ fed to an input line S23 of an "and" gate 40–7 shown in FIG. 3A forming part of a status gate circuit 40. The point of connection of this line to the computer (as are other connections to be referred to) is shown by a correspondingly numbered point (S23) in FIG. 5. FIGS. 5, 5A and 5B show parts of the Elliott computer disclosed in the aforesaid handbook.

The "and" gate 40–7 also includes two additional input lines respectively identified as "F 75 6144" and "T1 through T29 odd." The line F 75 6144 is shown also in FIG. 3D as one of four output lines in a decoding gate circuit generally indicated by reference numeral 41. The decoding gate circuit 41 receives various signals from the operations register section 8 of the Elliott computer shown in box form in FIG. 2A and in circuit form in FIGS. 5 and 5A indicating the presence of various instructions and conditions in the computer. For example, when a computer program step calls for a pseudo interrupt operation, a portion of the operations register will have a pseudo interrupt instruction or order therein indicated by the code number 75 6144. This code number will appear in a function register 8–2 (FIGS. 2A and 5). The other instruction or order code numbers which control operations in the interrupt apparatus 18 are 72 1024 which requires that the interrupt register 33 be read into the accumulator portion of the operations register, and code number 75 4096 which requires that selected R and C bits in the interrupt register 33 be reset. The presence of order 72 1024 in the function register 8–2 will be indicated by pulses on output line F 72 1024 and the presence of order 75 4096 will be indicated by the presence of pulses on output line F 75 4096. (The presence of pulses constitutes a "1" binary state, which must be present on all input lines of each "and" gate to open the gate.) The various connections from the decoding gates 41 to the Elliott computer are shown by various line connections identified by the letter S followed by a number which, as above indicated, appear in the circuit diagram of the Elliott computer of FIGS. 5 and 5A. As shown in FIG. 3D, the decoding gate circuit 41 comprises a series of "and" gates 41–1, 41–2, 41–3, 41–4, 41–5, and 41–6 whose inputs are connected in various combinations to the function register 8–2 and an address register 8–3 in the Elliott computer to sense the presence of the order numbers involved.

The T1 to T29 odd input line 35–2 of the "and" gate circuit 40–7 receives all of the odd time pulses in the entry cycle time period T1 to T30. It is thus apparent that the "and" gate 40–7 has a pulse output whenever the computer calls for a pseudo interrupt operation and a priority level time pulse is fed to the input line S23. The output of the "and" gate circuit 40–7 is fed to the aforesaid "or" circuit 40–2. It is apparent that the output of the "or" circuit 40–2 when a pseudo interrupt operation is called for is a pulse at an odd time T1 through T29 depending upon the priority level of the program routine involved.

All interrupt demand signal pulses which set A bit markers are fed through the "or" circuit 40–2. A pulse present on any of the input lines of the "or" circuit pass through the circuit to an output branch line 40–3 extending to one of the inputs of an "and" gate 40–6. The odd time priority level pulse involved will appear in the output of the "and" gate 40–6 provided that a "1" binary state signal is fed to all the other input lines of the "and" gate, namely on the lines $\underline{V}$, $\underline{R}$ and $\underline{B}$. The $\underline{R}$ and the $\underline{B}$ input lines of the gate circuit 40–6 extend to the similarly identified output lines of the R and B bit interrupt register bistable elements 33–10 and 33–8. These output lines have a "1" binary state when the R and B markers are not present during the odd times T1 through T29. The connection to the $\underline{R}$ line is made because when an R bit marker is present in the R bit bistable element 33–10, the $\underline{R}$ output line will have a "0" binary state indicating that the program routine involved was previously activated making unnecessary the setting of the corresponding A bit marker. The "0" binary state signal will prevent the opening of the "and" gate 40–7 to prevent setting of and A bit marker. When a B bit marker is present in the B bit bistable element 33–8, this indicates that the program routine involved is to be locked out which is effected by inhibiting the setting of an A bit marker for the priority level involved. The $\underline{B}$ line connection obtains this result since it has a "0" binary state signal when a B bit marker is not set in the bistable element 33–8 during the odd time involved. The $\underline{V}$ input line of the gate 40–6 extends to the $\underline{V}$ output line of an inhibit bistable 42–1 (FIG. 3C) forming part of what will be referred to as a priority scanner circuit 42. A "1" binary state signal is present on the $\underline{Y}$ output line of the bistable circuit 42–1 except during an interrupt operation where entry of information into the interrupt register is inhibited for about two word times to prevent interference with the interrupt operation by newly fed information.

The output of the "and" gate 40–6 extends to the "set A" input line of the A bit interrupt register bistable element 33–4 so as to set A bit markers corresponding to the priority levels which are demanded by the pseudo and external interrupt demand signals involved.

(e) *Setting of C bit markers (FIGS. 3 and 3A)*

Lines C1', C2'–C15' extend respectively from the patchboard terminals C1, C2–C15 to the inputs of "and" gates 36–1, 36–2 . . . 36–15. The latter gates have input timing lines T1, T3–T29 from the timer shift register 35 respectively extending thereto. These timing lines respectively receive pulses during the odd times T1, T3–T29 of each entry cycle. In effect, the patchboard terminals C1 through C15 are scanned during the odd time periods of the entry cycles to determine the presence of C bit demand signals. When such signals are detected, properly timed output pulses appear on output lines 36–1', 36–2' . . . 36–15' of the gates 36–1, 36–2 . . . 36–15. The latter lines extend to an "or" circuit 36–16 which provides pulses on an output line CW thereof at the entry cycle odd times corresponding to the patchboard terminals C1 to C15 receiving C bit demand signals. The output line CW connects with a branch line 40–9 within the status gate circuit 40 which branch line extends to one of the inputs of an "and" gate 40–10. A line $\underline{C}$ extends to the other input of the latter "and" gate, the line $\underline{C}$ extending to the correspondingly identified output line of the C bit interrupt register bistable element 33–2. As previously indicated, during the successive odd times T1, T3, T5, etc., the information in the bistable element 33–2 will respectively be the C1, C2, etc. bit marker information. When a C bit marker is not present in the latter bistable element during these odd times, a "1" binary state signal will appear on the output line $\underline{C}$ which will open the gate 40–10 to allow a C bit timing pulse to appear in the gate output which is connected to a "set C" line leading to the corerspondingly identified output line of the C bit interrupt register bistable element 33–2. The presence of an output pulse on this "set C" line will set a C bit marker corresponding to the odd time involved.

(f) *Generation of interrupt signal from C bit demand information*

The circuit shown in FIG. 3A is designed so that a priority interrupt demand signal will not be generated until the setting of the C bit marker and the disappearance of the C bit demand signal involved for reasons previously explained. To this end, an inverter circuit 40–8 is used which provides on an output line $\underline{CW}$ a binary state signal opposite to the binary state signal at the input thereof. The output line CW of the "or" circuit 36–16 extends to the input of the inverter circuit 40–8 so that a "1" binary state signal appears at all times on the output line $\underline{CW}$ except when a C bit demand signal is present on the scanned patchboard terminals C1 through C15 during the odd times of each entry cycle.

The output line $\underline{CW}$ of the inverter circuit 40–8 extends to one of the inputs of an "and" gate 40–12. The latter gate has another input to which a C line is connected extending to the C output line of the C bit interrupt register bistable element 33–2, which has a "1" binary state signal whenever a C bit marker is present during the odd times of an entry cycle. Whenever a C bit marker is present, therefore, a "1" binary state signal will appear on the C line extending to the "and" gate 40–12 to effect a "1" binary state signal on an output line C–$\underline{CW}$ of this gate, provided a similar signal appears on the input line $\underline{CW}$. The latter situation occurs, as above explained, at all times except during the odd time periods when a C bit demand signal is present on the patchboard terminals C1 through C15 being scanned at a given instant. When a C bit demand signal disappears, as by the release of manual pushbutton 22a or 22b, a persisting "1" binary state signal appears at the output of inverter circuit 40–8 which is gated through the gate 40–12 when the corresponding previously set C bit marker reaches the interrupt register bistable element 33–2. The resulting pulse on the output line C–$\underline{CW}$ is fed to (FIG. 3B) one of the inputs of a number of three input "and" gates 38–6, 38–7, 38–8, 38–9 and 38–10 associated with a C bit grouping gate and register circuit 38 to be described which generates interrupt demand signals on one or more output terminals T11 through T15 depending on the number of priority levels to be activated by the C bit demand signals which were established on the C bit patchboard terminals C1 to C15.

The C1 to C15 C bit demand signaling means, such as the C1 and C2 bit switches 22a and 22b, may be arranged or grouped in any one of a number of different ways to establish up to five different priority levels or routines. To this end, a patchboard 32 is provided having a left hand column of terminals C1", C2"–C15" to which timing lines T1, T3, T5–T29 respectively extend to provide timing pulses occurring respectively at the odd times of each entry cycle. The patchboard 32 has a right hand column of terminals arranged in groups of three, namely terminal groups Cn1a–Cn1b–Cn1c, Cn2a–Cn2b–Cn2c . . . Cn5a–Cn5b–Cn5c. These five groups of terminals, sometimes called priority level grouping terminals, are respectively for the five different priority levels to which the various C bit demand signals can be assigned. As previously indicated, each of the C bit demand signals are assigned C bit numbers 1 through 15 by means of the patchboard connection 30a, 30b, etc. made to the C1 through C15 terminals of patchboard 30, and each of these C bit numbers has associated therewith a given odd time T1, T3– or T15 within an entry cycle. The timing lines T1, T3, etc. connected to the patchboard terminals C1" through C15" correspond to these same time assignments. The various C bit demand signals are assigned to any of the five different priority levels by means including patchboard jumpers like 32–1a and 32–1b extending from the patchboard terminals C1" and C2". These jumpers are shown extending to the terminals Cn1a and Cn1b associated with the first group of terminals because they are to share the same program routine. They could have been connected to different terminal groups if they were to activate different routines shared by other C bit signaling means (not shown).

The various lines extending from the Cn terminals of each of the aforesaid groups extend to a different "or" circuit 38–1, 38–2, 38–3, 38–4 or 38–5. Thus, timing pulses will appear at the output of the various "or" gate circuit 38–1, 38–2 . . . 38–5 depending on the connections of the grouping jumpers. Respective output lines 38–1' through 38–5' extend from the "or" circuits 38–1 through 38–5 to one of the inputs of respective three input "and" gates 38–6 through 38–10. One of the other inputs of the latter gates are also connected in common to the C–$\underline{CW}$ line of the "and" gate 40–12 of the status gate circuit 40 which provides a "1" binary state signal during the entry cycles following the release or disappearance of a C bit demand signal as a C bit marker enters the C bit bistable element 33–2 of the interrupt register. In the absence of an R bit marker for a given shared routine, the "and" gates 38–6 through 38–10 which is associated with the C bit signal involved which has disappeared and which still has a C bit marker in the interrupt register will open to initiate an interrupt demand signal. Each of the "and" gates 38–6 through 38–10 includes an additional input line extending to a common $\underline{U}$ line extending to a flip-flop circuit 42–35 in the aforesaid priority scanner circuit 42

(FIG. 3C). The line U has a "1" binary state signal which prepares the gates invloved for opening only when the flip-flop circuit 42–35 is reset. At other times it has a "0" binary state signal. The latter circuit is reset except during the activation of a computer program step which calls for the resetting of C and R bit markers in the interrupt register (or a pseudo interrupt operation). During these instances the gates 38–6 through 38–10 are closed temporarily to terminate all C bit interrupt demand signals for several word times. When a C bit sub-routine is completed and the program has called for the resetting of a C bit marker, the presence of a second C bit marker for the priority level involved could result in the continued presence of a C bit interrupt demand signal and the corresponding A bit marker during the next scan and entry cycles which would lockout the shared routine involved. In a manner to be explained, the U line connection prevents re-establishment of a corresponding C bit interrupt demand signal on the terminals T11 through T15 until the corresponding A bit marker is reset. Then, the presence of an unacted upon C bit marker in the interrupt register will initiate a new interrupt demand signal which will be effective to cause an interrupt operation at the proper time.

The outputs of the "and" gate circuits 38–6 through 38–10 are connected to delay units 38–6' through 38–10' respectively. which add a 1 unit time delay. Thus, if the delay units receive a pulse at time T1, they will deliver a pulse at time T2. The outputs of the delay units are respectively connected to the set inputs of flip-flop (bistable) circuits 38–11 through 38–15. The outputs of these and other bistable circuits will be separately identified by reference letters or numbers which are sometimes underlined and sometimes not. The reference characters which are not underlined identify outputs which have "1" binary state signals when the flip-flop circuits involved is set and a "0" binary state signal when the circuits are reset. The reference characters which are underlined identify outputs which have "0" binary state signals when the circuits are set and "1" binary state signals when the circuits are reset. The flip-flop circuits 38–11 through 38–15 have outputs 38–11' through 38–15' which respectively are connected to said terminals T11 through T15. Thus, whenever a C bit demand signal disappears, the flip-flop circuit associated with the assigned priority level grouping terminals will be in a set condition and the associated terminal T11, T12 . . . or T15 will have a "1" binary state signal which is an interrupt demand signal. Each of the used flip-flop terminals T11 through T15 (only terminal T11 is used in FIG. 3) is connected with a different priority level patchboard terminals P1 through P15 by means of a line like line 25 which extends from the terminal T11 to the No. 1 common entry terminal of the patchboard 30. As previously indicated, the patchboard connection 30–5 extends between the latter terminal and the P5 priority level terminal of the patchboard.

The flip-flop circuits 38–11 through 38–15 are individually reset to cancel the interrupt demand signals on the associated terminals T11 through T15 when the computer program calls for the resetting of the C bit markers involved. To this end, a series of two input "and" gates 38–24 through 38–28 are associated respectively with the flip-flop circuits 38–11 through 38–15. The outputs of these "and" gates are respectively fed to the reset inputs of these flip-flop circuits. The "and" gates 38–24 through 38–28 each has an input connected to a reset A (to reset C bit) line extending from the correspondingly identified output of "and" gate 40–25 of the status gate circuit 40 (FIG. 3A) where operation will be described in a subsequent section of the specification. Suffice it to say, a pulse ("1" binary state signal) will appear on the reset A line during the even times of each scan cycle whenever a computer program calls for the resetting of a particular Cn (or Rn) bit marker and a corresponding C bit marker signal is fed by the computer at time T2n to the status gate circuit in a manner to be explained. The "and" gates 38–24 through 38–28 have respective inputs connected to the outputs of the associated "or" circuits 38–1, 38–2, 38–3, 38–4 and 38–5 through one time unit delay means 38–17, 38–18, 38–19, 38–20 and 38–21 which respectively provide output pulses at the times dependent on the C grouping connections made on patchboard 32. In the circuit of FIG. 3B since only C bit terminals C1" and C5" are connected by patchboard connections to the "or" circuits, namely "or" circuit 38–1, the output of delay means 38–17 will have pulses at times T2 and T10 (T1 and T9 plus one time unit) which will reset flip-flop 38–11 only when the corresponding C1 or C5 markers is being fed by the computer to the sampling gate circuit 40. Thus, if this occurs, flip-flop circuit 38–11 will be reset to cancel an interrupt demand signal T11 for seven word times until the "0" binary state signal on the U input line of "and" gate 38–6 disappears. In the meantime, the corresponding A bit marker is reset. If a second C bit marker exists in the same grouping, a second interrupt demand signal will be generated and the corresponding A bit marker set.

(g) *Feeding of C and A digits to computer (FIG. 3A)*

The C and A digits in the interrupt register 33 are fed to the computer during the operation of a program routine operated by C bit demand signals. The manner in which the computer handles the C and A digits will be described later on in the specification. The means for feeding the C and A digits from the interrupt register include an "and" gate 40–13 forming part of the status gate circuit 40. The "and" gate has input lines extending from the output of a one time unit delay means 40–13'. The input of the delay means is connected to the output of "and" gate 40–12 where a pulse ("1" binary state signal) appears each time a C and A bit marker is present in the interrupt register bistable element 33–2 during the odd times of the entry cycle period T1 through T30, provided no C bit signal is present in the outputs of the sampling gates 36–1, 36–2—36–15 at the instants involved. The delay means 40–13' delays an odd time pulse one basic time unit to make an even time pulse so that the C and A digits are fed in the computer at the proper time.

The "and" gate 40–13 has a second input line identified as line F 72 1024 which represents the computer order number requiring the reading of the interrupt register C and A bits into the computer. The line F 72 1024 extends to the correspondingly identified output line of the decoding gate circuit 41 (FIG. 3D). As previously indicated, a continuous series of pulses will be present on the line F 72 1024 when the gate member involved is present in the function and address registers, respectively, of the operations register of the computer. These pulses are synchronized with the timing pulses operating upon the interrupt apparatus 18. Consequently, when the order number F 72 1024 is active, pulses will appear in the output of the "and" gate 40–13 which will appear at the times when the interrupt register bistable element 33–2 have C and A bit markers during an entry cycle. The output of the "and" gate 40–13 is connected by a line 40–13" to a point in the computer identified by reference character S22 (FIG. 5).

(h) *Resetting A and R bit markers and setting and resetting B bit markers (FIG. 3A)*

When a particular priority interrupt demand signal disappears, it is useful to reset the corresponding A bit marker provided the program routine involved has begun (i.e. is activated). Otherwise the A bit marker is retained. To this end, a three input "and" gate 40–14 is provided. One of the inputs extends to an output line 40–15" of an inverter circuit 40–15 whose input is connected to the output of the "or" circuit 40–2 which has an output any time a demand priority interrupt signal is scanned. The output of the inverter circuit thus has a "1" binary state in the absence of an interrupt demand signal and will have a "0" binary state when an interrupt demand signal is scanned.

The second input to the "and" gate 40–14 extends to the R output line of the interrupt register bistable element 33–10 which contains the R bit information during the odd times of an entry cycle. Thus, when a particular R bit marker is present in this bistable element indicating that the program routine involved is activated, the "1" binary state signal will appear on the output line R to prepare the gate circuit 40–14 for opening when the interrupt demand signal involved disappears.

The third input to the "and" gate 40–14 is a T1 to T29 odd input line which, like the other similarly identified lines, has timing pulses during the odd times of T1 through T30, of the entry cycle. It is thus apparent that the gate 40–14 will be opened to feed a properly timed pulse to the output of the gate which extends to the input of the A bit bistable element of the interrupt register to reset an A bit marker.

If a second interrupt demand signal appears for a particular priority level before completion of the associated program routine, the presence of such a second demand will be indicated by the setting of a corresponding B bit marker in the interrupt register. To this end, an "and" gate circuit 40–17 is provided having three inputs. One of these inputs is fed by a line 40–3' extending to the output of the "or" circuit 40–2 which provides a signal pulse indicating a "1" binary state whenever a priority interrupt terminal P1 through P15 is scanned indicating the presence of an interrupt demand signal. The second input to the "and" gate circuit 40–17 is fed by an R line extending to the correspondingly identified output of the interrupt register bistable element 33–10 which has a "1" binary signal thereon when the program routine identified therewith has been activated but not yet completed.

The third input to the "and" gate 40–17 is a line A extending to the correspondingly identified output line of the interrupt register bistable element 33–4 which provides a pulse whenever an A bit marker is present therein which is during the odd time periods T1 through T29. When the gate 40–17 is opened, a "1" binary state signal will appear at its output extending to the "set B" input line of the interrupt register bistable element 33–8. Thus, the reoccurrence of a particular demand signal before an activated program is complete will result in the setting of a corresponding B bit marker.

When the program routine of a priority level having a B bit marker is completed, the B bit marker is reset and immediately a corresponding A bit marker is set. To this end, an "and" gate circuit 40–19 is provided having three inputs. One of the inputs is fed by a line B extending to the correspondingly identified output of the interrupt register bistable element 33–8 which provides during the odd timing intervals T1 through T29 a "1" binary state signal when a B bit marker is present therein and a "0" binary signal when no binary bit marker is present therein. A second input is fed by a line A extending to the correspondingly identified output of the interrupt register element 33–4 which provides a "1" binary state signal during the odd times of the period T1 through T29 when no A bit marker is present therein and a "0" binary state signal when an A bit marker is present. The third input is fed by a line P extending to the output of an "and" gate 40–26 which in a manner to be explained, has an output pulse ("1" binary state signal) during the resetting of the corresponding R bit marker at an odd time during the entry cycle. Thus, the "and" gate 40–19 is opened when an A bit marker is absent and a B bit marker is present during an R bit reset operation. The opening of the gate provides a pulse at the odd time of the entry cycle assigned to the priority level involved, which pulse is fed to the reset B line of the interrupt register bistable element 33–8 and to the set A line of the interrupt register bistable element 33–4. An isolating diode 40–19' is provided to prevent feedback of pulses from the set A line to the reset B line.

The resetting of the C and R bit markers involves the feeding of a binary code group in the computer (accumulator) serially to an "and" gate 40–21 forming part of the status gate circuit 40. At interrupt time T1, the first or least significant bit of the code group to be described is fed to an input line S23 of the "and" gate 40–21. This input line connects with the computer circuitry at point S23 in FIG. 5. The code group referred to, which is obtained from the computer memory when a program step, requires the resetting of the R or C bit markers in the interrupt register. When a C bit is involved, the code group will contain a "1" binary bit in the $2n$ position thereof where $n$ is the number of the C bit involved. The least significant bit position of the code group is assumed to be position No. 1. Where an R bit is involved, the code group will contain a "1" binary bit in the $2n$ minus 1 position, where $n$ is the number of the priority level involved.

It will be recalled that during the odd times in an entry cycle, that is during T1, T3–T29 odd, the R bit markers will be in the R bit bistable element 33–10. Also, during the even times during an entry cycle, namely times T2, T4–T30, the C bits will be in the A bit bistable element 33–4. Accordingly, to reset an $Rn$ bit marker a pulse must be fed to the reset R line of the bistable element 33–10 during time $2n-1$. To reset a C marker, a pulse must be fed to the reset A line of the A bit bistable element 33–4 during time $2n$. This is accomplished automatically by feeding the aforementioned C and R reset code group from the computer to the S23 input of the "and" gate 40–21 serially beginning at time T1.

The gate 40–21 has a second input line F 75 4096 which extends to the correspondingly identified output line of the decoding gate circuit 41 which, as previously indicated, will have pulses when the computer program calls for a reset interrupt operation. The output of the "and" gate 40–21 extends through a branch line 40–21' to one of the inputs of an "and" gate 40–25. The latter gate has another input line T1–T30 even extending to the correspondingly identified output line 35–4 of the timer shift register 35. The output of the "and" gate 40–25 is connected by a reset A line to the correspondingly identified line of the A bit bistable element 33–4. It is apparent that a pulse will appear at the output of the "and" gate 40–25 during an entry cycle at the proper time to reset the appropriate C bit marker called for by the computer program.

Another branch line 40–21" extends from the output of the "and" gate 40–21 to one of the inputs of an "and" gate 40–26. The gate has another input line T1–T29 odd extending to the correspondingly identified output line 35–2 of the timer shift register 35. A pulse will thus appear in the output of the "and" gate 40–26 at the proper time to reset an R bit marker in the interrupt register. The output of the latter gate is connected by a reset R line to the correspondingly identified line of the R bit bistable element 33–10.

*(i) Lockout operation (FIG. 3A)*

When a demand signal persists beyond the completion of the associated program routine, as previously indicated this routine is prevented from being operated again until the demand signal involved disappears. This is to prevent a continuing signal from effecting a multiplicity of operations of the same routine when only one is obviously needed. To this end, an "and" gate 40–23 is provided having three inputs. One of these input lines is fed by said line P which is pulsed during the resetting of each R bit marker. The second input is fed by a line B extending to the correspondingly identified output line of the interrupt register bistable element 33–8 which provides during the odd time periods from T1 to T29 a "1" binary state signal when the B bit marker is not present and a "0" binary state signal when the B bit marker is present.

The third input is fed by a line A extending to the correspondingly identified output of the interrupt register element 33–4 which provides a "1" binary signal when an A bit marker is present therein and a "0" binary state signal when an A bit marker is absent. Thus, the "and" gate circuit 40–23 will provide an output pulse whenever a program reset operation is involved and the corresponding A bit marker is present but the B bit marker is not present. This pulse in the output of the latter gate is fed to "set B" input line of the interrupt register bistable element 33–8 which will result in the setting of a B bit marker during the odd times involved. A pulse present in the output of the "and" gate 40–23 is also effective to reset the corresponding A bit marker by means of a reset A line extending to the correspondingly identified input to the interrupt register bistable element 33–4. An isolating diode 40–23′ is provided to prevent feedback of pulses from the reset A line to the set B line.

As will appear, the presence of a B bit marker and the absence of an R bit marker for the corresponding priority level will lock out the associated program routine from operation.

The B bit marker representing a persisting demand signal is reset whenever the associated demand signal disappears. To this end, an "and" gate circuit 40–24 is provided which has three inputs. One of these inputs is fed by a T1–T29 odd input line where the odd time pulses appear during each entry cycle. A second input is fed by a line $\overline{R}$ extending to the correspondingly identified output of the interrupt register bistable element 33–10 which provides a "1" binary state signal when an R bit marker is not present during the odd time periods of an entry cycle and a "0" binary state signal when an R bit marker is present. The third output is fed by the A-Reg. output of the inverter circuit 40–15 which has a "1" binary state signal thereon when a demand signal is not present on the scanned priority level patchboard terminals P1 through P15 and a "0" at other times. Thus, the gate circuit 40–24 will be opened during the absence of a priority demand signal and the absence of an R bit marker indicating the completion of a program routine. The output of the gate 40–24 extends to the reset B input line of the interrupt register bistable element 33–8.

*(j) Resetting R bits, priority level scanning and interrupt operation (FIG. 3C)*

The setting of the R bits in the interrupt register is carried out in a circuit referred to as a priority scanner circuit 42. The priority scanner circuit scans the A and R bits in the interrupt register starting with those bits of the highest priority level and, upon detection of the highest priority A bit marker coinciding with the corresponding absence of an R bit marker indicating that the priority routine involved has not yet been activated, initiates a program interrupt operation so that the computer will carry out the highest demanded priority level routine. If the program being carried out by the computer at a given instant is of a highest priority order relative to any routine which has been demanded, an interrupt operation will not take place.

The priority scanner operates to carry out its scanning function during the odd times T31 to T59 of the scan cycle, that is during the time period immediately following each entry cycle. This is illustrated in FIG. 7.

The circuitry for the preferred form of the priority scanner is illustrated in FIG. 3. This circuit includes an "and" gate 42–2 having three inputs. One of these inputs is fed by a T31 to T59 odd input line extending to the correspondingly identified output of the timer shift register 35, the line having pulses only during the odd times between T31 through T59. During these periods, it will be recalled that the C and A bit information will be present in the B and R bit interrupt register bistable elements 33–8 and 33–10, respectively, and the R bit and B bit information will be respectively in the A and C bit interrupt register elements 33–4 and 33–2. During the odd times of each scan cycle, therefore, the contents of the bistable elements 33–4 and 33–10 must be examined to determine the presence or absence of R and A bit markers. To this end, the "and" gate 42–2 has an input line R extending to the correspondingly identified output line of the R bit interrupt register bistable element 33–10 which indicates the status of the A bits during the odd times referred to. The "and" gate 42–2 also has an input line $\underline{A}$ extending to the correspondingly identified output line of the A bit interrupt register bistable element 33–4 which indicates the status of the R bit information during the odd times involved. A "1" binary state signal will thus appear on the R and $\underline{A}$ output lines during the odd times of each scan cycle when an A bit marker is present and an R bit marker is absent in the bistable elements involved. It is apparent that at time T31 the A1 and R1 bit information is examined, and during the subsequent odd times the successively lower priority level A and R bit information is examined.

If the "and" gate 42–2 senses the absence of an R bit marker and the presence of an A bit marker before the scanner reaches a priority level whose routine is presently activated, a priority interrupt operation will be carried out. To this end, the output of the "and" gate 42–2 is connected by a line 42–2′ to one of the inputs of an "and" gate 42–4. The latter gate has two additional input lines, one being input line $\underline{Q}$ which extends from the correspondingly identified output of an interrupt control flip-flop circuit 42–6. The $\underline{Q}$ output provides a "1" binary state signal when the flip-flop circuit is in a reset condition and a "0" binary state signal when the flip-flop circuit is in a set condition. In a manner to be explained, the flip-flop circuit 42–6 is, in general, reset every two word times of the computer by the $\overline{It}$ pulse referred to above. The exception is when an interrupt operation occurs which initiates almost immediately a resetting of the flip-flop circuit 42–6.

The "and" gate circuit 42–4 has a third input line 42–7′ extending from the output of an "and" gate 42–7 having three input lines S23, S15 and $\overline{G6B}$. The latter "and" gate is for the purpose of preventing an interrupt operation when certain portions of the computer are busy. The input lines S23 and S15 extend to the correspondingly identified points in the computer core circuitry shown in FIGS. 5 and 5B. The $\overline{G6B}$ signal is generated by a combination of gates forming part of the decoding gate circuit 41 (FIG. 3D) and which are connected to the computer core circuitry of FIGURE 5 in the manner indicated by the "S" connections. These busy signals on these lines extending to the "and" gate 42–7 occur infrequently relative to the total operating time of the computer and so do not affect the proper operation of the interrupt system.

Suffice it to say, normally, the "and" gate 42–7 will provide a "1" binary state signal on the output line 42–7′ thereof, thereby preparing the "and" gate 42–4 for opening when the other two lines $\underline{Q}$ and 42–2 have a "1" binary signal thereon. When the need for an interrupt operation is detected by the "and" gate 42–4, a "1" binary signal will appear on the output line 42–4′ thereof which extends to the set input of a flip-flop circuit 42–9. The presence of a pulse on line 42–4′ will set the flip-flop circuit 42–9. The latter circuit has an output line $f$ which will have a "1" binary state signal when the flip-flop circuit is set and a "0" binary state signal when the circuit is reset. The flip-flop circuit also has another output line $\overline{f}$ which will have a "1" binary state signal when the flip-flop circuit is reset and a "0" binary state signal when the circuit is set. Before an interrupt operation is initiated, the flip-flop circuit 42–9 will be in a reset condition where the output line $\overline{f}$ thereof has a "1" binary state signal. The output line $\overline{f}$ extends to one of the inputs of an "and" gate 44–13 in the counter and gate circuit 44. This gate controls the feeding of count pulses during the odd times T31, T33–T59 of each scan cycle appearing on a T31–T59 odd input line extending to the correspondingly identified output of the timer shift register 35. The output of the "and" gate 44–13 extends to the input of a conventional five stage scale of two binary pulse counter 44–15. For illustrative purposes, it will be assumed that the binary counter 44–15 comprises a series of cascaded bistable circuits with output lines 2–0, 2–1, 2–2, 2–3 and 2–4 which have "1" when the associated bistable circuits are set. The counter is initially set to the count of 5 at the beginning of each scan cycle by one or more reset "and" gates 44–16 which has one input $f$ extending to the correspondingly identified output of gate 42–9 and an input T30 extending to the T30 output of the timer shift register 35. The number 5 corresponds to an address location in the computer memory where a priority order for priority level No. 1 is located. The priority orders for the fourteen next highest routines are in memory address locations 6–19. The priority orders transfer the program to different address blocks in the computer memory where the instructions of the rest of the program routines involved are located. When an interrupt operation is initiated, and the flip-flop circuit 42–9 is reset, the output line $f$ will have a "0" binary state signal which will close the gate 44–13 to freeze the count in the counter 44–15 until the flip-flop circuit 42–9 is reset.

The output line $f$ connects with a branch line $f1$ leading to the input of an "and" gate 44–11. This gate also has an interrupt time signal input line which receives a pulse from the computer regularly a given time interval after each scan cycle and before the next entry cycle, such as time T72 indicated in FIG. 7. The actual point of connection of this line into the computer circuit is shown by the reference character S24 which corresponds to the similarly numbered point of connection shown in the computer circuit diagram of FIG. 5A. Thus, when the need for a program interrupt operation is present indicated by a "1" binary bit signal on the input line $f1$, the latter being a continuous binary signal rather than a pulse signal, the interrupt operation will take place during the next generated interrupt pulse on the line S24. Then, a "1" binary state signal will appear on an output line E$t$ of the "and" gate 42–11 which output line extends to one of the inputs of gates 44–0, 44–1, 44–2, 44–3 and 44–4 forming part of a gate and counter circuit 44. The latter gates have other inputs extending to the output lines 2–0 to 2–4 of the counter 44–15. These gate circuits will pass a composite binary signal to output lines S19–0 through S19–4 extending to correspondingly identified points of the address register 8–3 of the computer 8 (FIGS. 2A and 5A) which is the core memory address in the computer memory 8–5 where is located the priority order which will initiate the program routine involved. This will be explained in more detail hereinafter. The output line E$t$ is also connected by a connection S25 to a control unit 8–4 (FIG. 2A) in the computer to inhibit entry of another address in the address register.

The output line E$t$ of the "and" gate 42–11 has connected thereto a branch line E$t$–1 extending to the set input of the flip-flop circuit 42–1 previously referred to. The flip-flop circuit 42–1 has an output line $\underline{U}$ which has a "1" binary state signal when the circuit is reset and a "0" binary state signal when the circuit is set. Accordingly, during an interrupt operation, the output line will have a "0" binary state signal which will prevent the setting of the A bit markers in the interrupt register during the next two entry cycles due to its connection to the $\underline{U}$ input of "and" gate circuit 40–6 in FIG. 3. The flip-flop circuit is reset automatically every two word times by a reset line $\overline{\text{II}t}$ extending to a point S18 in the computer core circuitry (FIG. 5A).

The output line $\underline{U}$ also extends to one of the inputs of an "and" gate 42–22. When an interrupt operation has been initiated, the presence of a "0" binary bit signal at this input will prevent interference with the current interrupt operation by a manual switch 42–24 which may be normally operated by an operator to prevent subsequent interrupt operations when desired. The switch 42–24 is a grounded switch extending to a second input of the "and" gate 42–22. When the switch 42–24 is closed, and an interrupt operation is not presently being initiated, a "1" binary state signal will appear on the output of the latter gate which will pass through an "or" circuit 42–26. The output of the "or" circuit extends to the reset input of the flip-flop circuit 42–9 normally to inhibit the setting when the switch 42–24 is closed. The "or" circuit 42–26 has another input fed by the $\overline{\text{II}t}$ line extending to computer connection S18. The presence of an II$t$ pulse every two word times will pass through the latter "or" circuits to reset the flip-flop circuit 42–9.

When an interrupt operation has taken place and a corresponding program routine has begun, it is, of course, necessary to set a corresponding R bit marker in the interrupt register to indicate that this routine has been activated. The setting of the R bit marker is carried out by means of an "and" gate 42–27. This "and" gate, as will appear, will effect the setting of an R bit marker during the word time following the initial interrupt operation to avoid interference with the interrupt operation. The "and" gate 42–27 has one input 42–4" extending to the output of the "and" gate 42–4 which senses the A and R bit status requiring interrupt at an odd time during a scan cycle. The "and" gate 42–27 has a second input extending through a one time unit delay means 42–29 to the $f$ output of the flip-flop circuit 42–9. The "1" steady state binary state signal appearing at the output $f$ when a first interrupt operation for a priority level occurs at an odd time and the delay means 42–29 delays this one time unit so that the "1" binary state signal initially appears at the input of the "and" gate 42–27 at an even time to miss the interrupt pulse fed to the other input thereof from gate 42–4 occurring at the odd time before. However, during the interrupt operation occurring the next word time, both inputs of the "and" gate 42–27 will have "1" binary state signals momentarily and a pulse will appear in the output of the latter gate. The output of this gate is connected to the "set A" input line of the interrupt register bistable element 33–4 which has the R bit information therein of the priority level involved during the odd times of the scan cycle. Because of the particular circuit logic involved, the reset operation requires that a given interrupt operation be repeated the following scan cycle. It will be recalled that the flip-flop circuit 42–6 was set to initiate an interrupt operation. The Q output of this circuit will then have a "0" binary state signal which would prevent the opening of the "and" gate 42–4 necessary to initiate a new interrupt operation. The second or new interrupt operation referred to is possible because the flip-flop circuit 42–6 is reset during the word time of the first interrupt by the signal fed thereto through the "or" circuit 42–34 by lines E$t$2 and E$t$–1. The second interrupt operation will then be initiated as the "and" gate 42–4 senses again the presence of the A bit marker and the absence of an R bit marker to be set during the scan cycle involved.

As previously indicated, when the priority scanner circuit 42 scans a priority level which is currently activated and not complete prior to the scanning of a demand signal requiring a new interrupt operation, the scanner will be inhibited from carrying out an interrupt operation for the remainder of the scanning cycle involved. To this end, an "and" gate 42–29 is provided having an input line T31–T59 odd extending to the timing register 35 so as to provide pulses at all of the odd times during each scan cycle. The latter "and" gate has an input line A which extends to the correspondingly identified output of the interrupt register bistable element 33–4 which gives the status of the R digit information during the odd time periods involved. Accordingly, if an R bit marker is present indicating that the priority level involved is currently active, a "1" binary state signal will appear in the output of the "and" gate 42–29 which is fed to "or" circuit 42–31 which passes the signal to the set input of the aforementioned flip-flop circuit 42–6. The setting of the flip-flop circuit 42–6 will result in a "0" binary state signal in the output Q thereof which will prevent the opening of the "and" gate 42–4 necessary for initiating an interrupt operation until the gate is reset two word times later in a manner to be explained. (As above indicated, the flip-flop circuit 42–6 is in effect an interrupt inhibit circuit when it is in a set condition.)

Normally, the resetting of the interrupt inhibit flip-flop circuit 42–6 is under control of an "and" gate 42–33 having an output 42–33' feeding an input of "or" circuit 42–34. The "and" gate 42–33 has an input line which extends to the connecting point S18 which receives from the computer a pulse every two word times. The other input of the "and" gate 42–33 extends from the output of a one unit time delay means 42–38 whose input is connected to a line U extending to the correspondingly identified output of a flip-flop circuit 42–35. When the flip-flop circuit 35 is reset, a "1" binary state signal will appear at the output U and when it is set a "0" binary state signal will appear thereat. Normally, the flip-flop circuit 42–35 is in a reset condition initially obtained by an Ht pulse appearing on a reset input line Ht connected to said point S18. The resulting steady "1" binary state signal keeps the gate 42–33 open so that the Ht pulse fed thereto will pass through the gate and the "or" circuit 42–34 to reset the flip-flop circuit 42–6 and permit a new interrupt operation every two word times.

In a manner to be explained, the flip-flop circuit 42–35 serves to inhibit an interrupt for three to four word times under two conditions of operation of the interrupt system. One of these conditions is the actual carrying out of a pseudo interrupt operation and the other is the resetting of the R and C digits in the interrupt register under the control of the computer program. Accordingly, the flip-flop circuit 42–35 has a set input line extending to the output of an "or" circuit 42–36 having input lines F 75 4096 and F 75 6144 extending to the correspondingly identified outputs of the decoding gate circuit 41 (FIG. 3D). The order numbers 75 4096 and 75 6144 respectively represent the computer orders for R or C reset operation and a pseudo interrupt operation. By means of the decoding gate circuit 41, a "1" binary state indicating pulse appear on the input lines F 75 4096 and F 75 6144 when the computer program respectively calls for these operations. The resulting "1" binary bit signal appearing at the output of the "or" circuit 42–36 will set the flip-flop circuit 42–35 to provide a "0" binary bit signal on the output line U thereof. This will close the gate circuit 42–33 to prevent the next Ht pulse from resetting the interrupt inhibit flip-flop circuit 42–6, until the flip-flop circuit 42–35 is reset. It should be recalled that the flip-flop circuit 42–6 will be set each word time by either an interrupt operation or by the scanning of an R bit marker associated with the program routine currently in operation. Also, the setting of the flip-flop circuit 42–6 will provide a "0" binary bit signal in the output line Q which will prevent the opening of the interrupt "and" gate 42–4. The first Ht pulse fed to the "and" gate 42–33 after the setting of the flip-flop circuit 42–35 will not open the "and" gate 42–33 to permit resetting of the gate 42–6 because of the presence of the "0" binary state signal on the other input line U thereof at the instant of receiving this pulse. However, this same Ht pulse is fed to the reset input of the flip-flop circuit 42–35 which will reset the same. The delay means 42–38 delays the feeding of the reset "1" binary state signal to ensure that the next (rather than the present) Ht pulse will open the gate 42–33 and reset the flip-flop circuit 42–6. Since the Ht pulses occur every two word times, it is apparent that the presence of the order numbers 75 4096 or 75 6144 will result in a four word time inhibit of an interrupt operation.

*(k) Display of R bit markers (FIG. 3A)*

As previously indicated, another aspect of the invention relates to the display on indicator lights 19–1 to 19–15 of the activation of various program routines approximately as they occur. It should be understood, however, that the time of occurrence of many of the program routines will be such a short period that an operator could not see the momentary flashing of the indicator lights involved. Accordingly, control circuits are provided for the lamps to expand the time during which an indicator lamp will be lit so that the operator can see the flashing of the light. The indicating lamp circuit involved is shown at the bottom of FIG. 3A and is indicated generally by reference numeral 46. The activation of a program routine is determined by examining the R bit markers in the interrupt register 33. To this end, the R bit indicator circuit is provided with a series of "and" gates 46–1, 46–2, 46–3 . . . 46–15, one for each priority level handled by the monitoring system. These "and" gates have a common input line R extending to the correspondingly identified output of the interrupt register bistable element 33–10. The "and" gates 46–1 through 46–15 respectively have second input lines identified as timing lines T1, T3, T5–T29 which respectively receive timing pulses from the timing register 35 at the odd times during the entry cycles. During these odd times, the R bits stored in the interrupt register will be in the shift register bistable element 33–10 so that "1" binary state signals will appear on the outputs of those gate circuits 46–1, 46–2 . . . 46–15 for the activated programs. The outputs of each of the "and" gates 46–1 through 46–15 respectively extend to the set inputs of respective mono-stable (i.e. oneshot multivibrator) circuits respectively indicated by reference numerals 46–1', 46–2', 46–3' . . . 46–15'. As is well known, a mono-stable circuit is one which is normally in a reset state and when triggered by a set signal stays for a fixed period in a set state and then automatically returns to its normal reset state. The mono-stable circuit, for example, may each be made of a pair of transistors or vacuum tubes, one of which is in a highly conductive state and the other of which is in a relatively non-conductive state during its reset condition. When the circuit is set, these conductive states momentarily reverse. The associated indicator lamps 19–1 through 19–15 may be placed directly in the plate or load circuits of the transistor or vacuum tube which is in a conductive state during the set condition of the mono-stable circuit, or can be controlled by a relay located in these plate or load circuits. The length of time the mono-stable circuits remain in a set condition is adjusted to occur for a time period sufficient to be seen by an operator.

When a given program routine is interrupted so that the program routine remains activated (although not currently operating because of the interrupt operation), the R bit marker indicating signals will probably appear at the output of the gate circuits 46–1 to 46–15 for a very large number of entry cycles and the associated lamp would be lit for an appreciable time. A light remaining on will thus indicate an interrupted program.

*(l) Elliott 803 computer*

Before explaining exemplary program routines which illustrate applications of the invention, it would be helpful briefly to outline some of the conditions in and features of the Elliott 803 computer which are necessary to the easy understanding of many of the individual program steps of the routines. It should be understood, however, that the broad concepts of the present invention are usable with practically all present day electronic computers. The Elliott 803 computer has been selected for purposes of illustration only.

The Elliott computer, as is common with most up to date electronic computers, operates with programs stored in the computer memory in the form of binary code groups representing numbers calling for different operations of the computer. These numbers are referred to as instructions or orders. In the monitoring system application of the invention being described the computer memory also stores in binary coded form information such as variable values, counter values, variable constants and the like. It will be assumed that the computer memory has storage locations grouped to form storage blocks in which related information is stored. The individual storage locations are identified by address numbers. As previously indicated, in the exemplary form of the invention being described, the so called priority orders for priority levels 1-15 are stored in a "block" having address numbers 5-19. To simplify the identification of storage locations, the bulk or remainder of the orders or instructions for the five routines to be explained in detail are stored in respective storage blocks having address numbers in the 100's (priority level 1), 200's (priority level 2), 300's (priority level 3), 400's (priority level 4) and 500's (priority level 5). The values of the scanned variables are stored in a block having address numbers 1000 plus $n$ ($n$ being the identifying number of the points or variables involved). These values are in straight binary form. For readout to an output device like typewriter 10, it is usually necessary to convert the binary numbers to binary decimal coded numbers which are stored in a block having address numbers 2000 plus $n$ where the binary digits are grouped to represent the different decimal digits. Various storage positions within each priority block are used to store binary bit code groups for resetting the associated R and C bit markers, for setting pseudo interrupt demand signals, and for one of the routines, for unlocking a locked out routine. Still other storage positions within the priority level block are used to store binary bit code groups representing a number identifying the point in the program routine which was interrupted by the program routine having the priority level involved and the contents of a part of the computer (referred to as an accumulator) at the time of the program interruption.

Each of the storage positions of the Elliott computer can accommodate 39 binary bits. Where the information stored represents only a single useful number, such as a data value, data constant or the like, a straight binary code of the 39 digits involved is utilized to indicate the number involved. However, where the information represents program instructions, the 39 bits are arranged into sub-groups which respectively represent five different numbers or informational elements. The 39 instruction bits will be referred to as an instruction word group. An instruction word group comprises two instruction words each formed of two numbers representing respectively a two digit function or order number and a four digit address number. Between the two groups of binary bits representing the two instruction words is a binary bit representing what will be referred to as a B-line identifying bit. The format of an instruction word group is shown in FIG. 12. For "basic orders," the address number normally identifies a location in storage upon which the operation called for by the order number is to be carried out. In arithmetic operations, an operation is normally performed on two numbers, one of which is in a storage location of the computer memory identified by the address number and the other of which is a number stored in the computer accumulator which is a register for holding information temporarily.

The Elliott computer is designed to carry out the instruction words 1 and 2 in the order named, the carrying out of each instruction word taking one word time of the computer, which as above explained, is 720 micro-seconds or 120 time units. For "basic orders," the computer normally carries out the instructions word groups located in successively numbered locations in storage. Provision is made, however, for transferring to remotely spaced storage locations to obtain the next instruction word group. These are obtained by transfer orders. Table III shows examples of basic, transfer and miscellaneous orders which are utilized in exemplary programs to be described. The table also shows the nature of the operations performed on the information in the storage location of the address of a basic order instruction word and in the computer accumulator, and the contents of the storage location involved and the accumulator after completion of a given order. The letters A and S refer to the information stored respectively in the accumulator and in the storage location involved prior to the carrying out of the operation involved.

During each word time of the computer, three different basic types of operations are performed in sequence. During the approximately first third of each word time, the address of the next instruction word is prepared and inserted into the address register. The middle third of each word time is taken up in examining one of the instruction words fed to the instruction register and the third portion of each word time is taken up in responding to or carrying out the instruction word involved. The relative timing of these portions of each computer word time and of the entry and scan cycles carried out by the interrupt apparatus previously described is illustrated in FIG. 7.

*Table III.—Exemplary orders used in Elliott 803 computer*

| Instruction type | Order code | Operation | Contents after order | |
|---|---|---|---|---|
| | | | Accumulator | Storage |
| Basic orders | 00 | Do nothing | A | S |
| | 02 | Replace and count | S+1 | S |
| | 03 | Collate (Extract common bits) | A & S | S |
| | 04 | Add | A+S | S |
| | 05 | Subtract | S−S | S |
| | 07 | Negate and add | S−A | S |
| | 10 | Exchange | S | A |
| | 20 | Write | A | A |
| | 22 | Count in store | A | S+1 |
| | 26 | Clear store | A | O |
| | 27 | Subtract from store | A | S−A |
| | 30 | Replace | S | S |
| Transfer orders | 40 | Transfer control unconditionally to first instruction of word | | |
| | 44 | Transfer control unconditionally to second instruction of word | | |
| | 41 | Transfer control to first instruction if accumulator negative | | |
| | 45 | Transfer control to second instruction if accumulator negative | | |
| | 42 | Transfer control to first instruction if accumulator zero | | |
| Miscellaneous orders | 55 | Shift up $n$ times, single length | | |
| | 72 | Specific device inputs into accumulator (address specifies the device) | | |
| | 75 | Contents of accumulator into specified device identified by address | | |

The computer also has a register referred to as a sequence counter register (SCR) which contains a number representing the storage location at which the current instruction word group is to be obtained. As previously described, the program routines usually progress in accordance with the instructions in successively numbered storage locations. The sequence counter register also has a bit which identifies whether the instruction word to be carried out is the first or second instruction word of the instruction word group involved.

In the exemplary program routines to be disclosed hereinafter, the presence of a B-line marker bit (identified by "/") will modify the address number of the second instruction word in the instruction word group involved by adding thereto the number stored in the storage location identified by the address number of the first instruction word in the group.

In the Elliott 803 computer, the aforementioned sequence counter register, instruction register and the accumulator are not fixed storage points but are moving storage points created by the circulation of 120 binary bits in a circulation register also referred to as the operations register. The operations register is indicated generally by reference number 8–1 in FIG. 2A. The bits advance one position each basic time unit (6 micro-seconds), taking 120 time units or one word time to complete the circulation of the contents thereof once. Distributed through the 120 bits of the circulation register are bits representing the aforementioned sequence counter register, the instruction register and the accumulator which respectively utilize 14 bits, 39 bits and 39 bits respectively of the 120 circulating bits (FIG. 8). Consequently, when it is stated that an instruction word group is fed to the instruction register, these 39 bits which are circulating in the operations register are replaced by a new instruction word group. Likewise, when information is fed to the accumulator, the 39 bits circulating in the operations register are replaced by the new accumulator information.

As shown in FIG. 2A, the operations register includes an arithmetic unit 8–1a through which the contents of the operations register frequently pass, shift unit groups 8–1b, 8–1c and 8–1d, and one or more delay lines 8–1e. During a given word time, the function or order number of the currently operative instruction word is gated into the previously mentioned function register 8–2, and the address number is gated into the previously mentioned address register 8–3. The operation performed by the computer during a word time is determined by a control unit generally indicated by reference numeral 8–4 which responds to the numbers stored in the function register 8–2 and the address register 8–3. It will be recalled that when an interrupt operation is effected, the address of the appropriate priority order instruction is fed into the address register 8–3. At this time, it is also necessary to send a signal (E$t$) to the control unit 8–4 to prevent entry into the address register 8–3 of an address currently circulating in the operations register.

When an instruction word is given to read information into the accumulator, the computer automatically gates information into the operation register to set the accumulator bits to the new information. To read the contents of the accumulator out of the operations register to the interrupt apparatus, connections are made at point S23 (FIG. 5A) to a point in the operations register where the least significant bit of the accumulator will be located at interrupt time T1.

As previously indicated, the Elliott 803 computer core circuitry of FIGS. 5, 5A and 5B need not and will not be described in this specification. The operation of the Elliott 803 computer is explained in the aforesaid Handbook. Suffice it to say, the circles shown in these figures represent conventional rectangular hysteresis core elements arranged on gates, bistable and shift register stages. The meaning of the various input and output connections symbols to each of the core elements is illustrated in FIG. 6.

(*m*) *Computer operations performed in connection with a program interrupt operation*

It will be recalled that when the priority scanning circuit 42 detects the need for an interrupt operation, an address is transferred to the computer address register 8–3 which will result in the feeding of a priority order instruction in the corresponding address in the computer memory into the operations register. Each of the priority orders (as indicated by the exemplary orders shown in FIGS. 13 through 17) includes two instruction words, the first of which stores the sequence counter register number in the operations register at the time of a program interruption in the first storage location of the priority level block of the interrupting program routine. As previously indicated, the sequence counter register number in the operations register identifies the point in the program which was interrupted by a demand for the operation of the program routine of higher priority. The second instruction word transfers control of the program to the instruction word group in the second storage location of the priority level block of the interrupting program routine which carries out a program step which transfers the accumulator contents to a storage location in the priority level block of the interrupting program. When a program routine is completed, an exit sub-routine will restore the sequence counter number and the accumulator contents of the interrupted program to the operations register.

The format of the storage in the computer memory for the priority level blocks for priority levels 1–5 is outlined in subsequent portions of the specification.

Each of the priority level blocks in the computer memory has stored in one of its storage locations binary coded bits for resetting the associated R bit marker in the interrupt register when the particular program routine is completed. This group of binary coded bits is referred to as the R*n* mask bit digits, where "*n*" is the priority level involved. The format for this R reset code group is shown in FIGS. 11a through 11d for exemplary levels 3, 4, 7 and 8. Each group of mask bit digits includes "0" binary bits in all 39 bit positions except the position 2*n*–1 (the lowest number position being the least significant or right hand bit position). This has a "1" binary bit which is the reset bit. Thus, the "1" binary reset bit for priority level 1 is in the first or right hand bit position, for priority level 2 in the third bit position from the right, for priority level 3 in the fifth position from the right, etc. When an R*n* bit marker is to be reset, the R*n* mask bit digits are read into the accumulator. At time T1 interrupt time, the first bit of the R*n* mask bit digits in the accumulator is fed to the terminal S23 of the operations register (FIG. 5A) connected to one of the inputs of "and" gate 40–21 of the interrupt apparatus shown in FIG. 3A. At interrupt time T2, the second bit in the accumulator will be fed to this point, at interrupt time T3 the third bit, etc. It will be noted that with this timing the connections of the status gate circuit 40 are such that the R bit markers in the interrupt register will be reset.

In a manner to be shown, the R1 mask bit digits are used to switch the scanner or multiplexer 4 to point No. 1.

For those program routines which are demanded by C bit signals, groups of C*n* mask bit digits are stored in the priority level block involved for resetting the C*n* markers in the interrupt register at the appropriate time. The format for the C mask bit digits is shown in FIGS. 10*a*, 10*b* and 10*c*. Considering the right hand bit as bit No. 1, the "1" binary reset bit will be in position 2*n*, wherein "*n*" being a number 1–15 which identifies the particular C bit signal involved. All other bits are "0" bits. When the program calls for the resetting of a C*n* bit marker in the interrupt register, the C*n* mask bit digits involved are fed from the priority block involved to the accumulator of the computer and then serially beginning at interrupt time T1 with the lowest number bit first to terminal S23 connected also to the input of "and" gate 40–21 in the status gate circuit 40. This will result in the resetting of the appropriate C bit marker in the interrupt register.

The $Cn$ mask bit digits are also utilized to determine the presence of $Cn$ markers in the interrupt register by an operation referred to as an extract C digits operation. First of all, the computer must carry out instruction word 72 1024 which feeds the C and A digits in the interrupt register 33 to the accumulator as previously explained. Then the computer obeys an "extract C digit" instruction word 03 N which feeds the $Cn$ mask bit digits from memory location N to the operations register where the C and A accumulator digits are automatically compared with the corresponding mask bit digits. The extract operation automatically modifies the accumulator so that it contains only a single "1" binary bit in the same bit position as the $Cn$ reset bit if the C and A digits have a $Cn$ bit marker in the same position. (It will be noted that the $Cn$ markers are located in the $2n$ bit position in the interrupt register as are the $Cn$ reset bits in the $Cn$ mask bit digit groups.) Otherwise the accumulator ends up with all "0" bits. The extract (or collate) operation just described is an operation built into the 803 computer and is carried out by basic order number 03. Thus, the presence of a "1" bit in the accumulator after an extract operation indicates the presence of a $Cn$ bit marker in the interrupt register where the appropriate sub-routine of the shared program routine (level 5) will be carried out.

Each program routine which initiates a pseudo interrupt demand signal has a group of priority level $An$ mask bit digits stored in one of the storage positions in the associated priority level block of the computer memory. The $An$ mask bit digits have the same format as the R mask bit digits as indicated in FIGS. 11a through 11d. Accordingly, each group of pseudo priority level mask bit digits comprises a "0" binary bit in each bit position except position $2n-1$ (where $n$ is the number of the priority level involved) which has a "1" binary state bit which generates the interrupt demand signal. When a pseudo interrupt demand signal is to be generated, the pseudo priority level mask bit digits are fed from the computer memory to the accumulator and at time T1 serially from the accumulator to the "and" gate 40–7 (FIG. 3A) with the least significant digit first.

(*n*) *Exemplary program routines*

To illustrate actual applications of the priority interrupt system of the invention, five specific program routines together with the instruction word groups stored in the computer memory will now be described. Other routines are referred to but are not disclosed in detail. The five routines are, in general, highly simplified routines to avoid unduly complicating this disclosure with needless and difficult to follow program steps. For example, normally the multiplexer input routine would be an almost continuous routine including the steps of comparing the scanned data with high and/or low alarm or control limits and effecting an alarm or control function if the limits are exceeded. These operations require a very large number of program steps which would unduly encumber this disclosure. Instead, the illustrative routine is triggered every five minutes where the only basic system operations to be illustrated is the storing of the scanned data values in the computer memory and the setting of the multiplexer to scan the next point until all points are scanned. This exemplary routine in association with the other routines is sufficient to illustrate the advantages and utility of the invention.

PRIORITY LEVEL 1—CLOCK ROUTINE

Every 15 seconds, a clock contact closure initiates an interrupt in level 1. Since this is the highest level, there will be an immediate interrupt of the existing program and the computer will be made to obey the priority orders of level 1 which are located in computer memory location 5. After storing away both the sequence register and the accumulator, the program of level 1 is started.

There are two counters in this program which are numbers stored in address locations 117 and 118, one, for the 5 minute count and the other, for the hour count. A count of one is added to the 5 minute counter and the result is checked if it has reached a count of 20 (5 minutes). If not, the program proceeds to the exit subroutine. If yes, a count of one is added to the hour counter and the result is checked for a count of 12 (1 hour). If not, it means that the hour has not been reached and hence, the 5 minute counter is cleared to zero and the multiplexer is switched to point number 1 by feeding the R1 mask bit digits stored in the 100's storage block to the multiplexer control circuit to be described. These digits have a "1" bit in the right hand bit position representing point No. 1. In this way, the scan cycle is started every 5 minutes and will be continued on level 2. After addressing the multiplexer, the program proceeds to the exit sub-routine.

Going back to the test of the hour counter, if it is found that the hour has been reached, a pseudo interrupt is set for level 4 to initiate a log by feeding the $An$ pseudo priority level mask bit digits stored in the 100's storage block to the accumulator and then to the interrupt apparatus as above described. The pseudo interrupt signal will be stored in the interrupt register as a first or second demand depending on whether that routine is in use. Since level 4 is a lower level than the current program level 1, it will be entered only after level 1 is exited and provided levels 2 and 3 are not active or have demands.

Returning to the program, after setting the pseudo interrupt to level 4, both counters are cleared to zero, the mutliplexer is set to point number 1 as stated above, and the program proceeds to the exit sub-routine.

Table IV shows the stored program and other data stored in the 100's storage block of the computer memory for priority level 1. FIG. 13 is a flow diagram of this routine.

*Table IV.—Contents of 100's storage block in computer memory for priority level 1*

| Storage address: | Contents of storage address |
|---|---|
| 100 | Sequence Counter Storage |
| 101 | Instruction Word 20 116: 22 117 (Store Acc. Contents: Add 1 to Counter 1) |
| 102 | Instruction Word 30 117: 05 112 (Counter 1 minus 20 to Acc.) |
| 103 | Instruction Word 42 106: 30 113 (Transfer if Acc. is 0: R1 Reset Bit Digits to Acc.) |
| 104 | Instruction Word 75 4096: 30 116 (Reset R1: Old Acc. Contents to Acc.) |
| 105 | Instruction Word 00 100/ 40 0 (Transfer to Interrupted Program) |
| 106 | Instruction Word 22 118: 30 118 (Add 1 to Counter 2: Counter 2 to Acc.) |
| 107 | Instruction Word 05 114: 42 110 (Counter 2 minus 12 to Acc.: Transfer if Acc. is zero) |
| 108 | Instruction Word 26 117: 30 113 (Clear Counter 1: Multiplexer Switch R1 Bit to Acc.) |
| 109 | Instruction Word 75 1024: 40 104 (Switch Multiplexer to Point 1: Transfer to Exit Sequence) |

| Storage address: | Contents of storage address |
|---|---|
| 110 | Instruction Word 30 115: 75 6144 (A4 Set Mask Bit Digits to Acc.: Signal Pseudo to Level 4) |
| 111 | Instruction Word 26 118: 40 108 (Clear Counter 2: Transfer to Location 108) |
| 112 | Upper Limit for Counter 1 (20) |
| 113 | R1 Reset Mask Bit Digits |
| 114 | Upper Limit for Counter 2 (12) |
| 115 | A4 Set Mark Bit Digits to Generate Pseudo Interrupt Signal |
| 116 | Old Acc. Storage |
| 117 | Counter 1 |
| 118 | Counter 2 |

PRIORITY LEVEL 2—MULTIPLEXER INPUT ROUTINE

The object of this routine is to cause the scanner or multiplexer 4 to scan all input points or variables once every five minutes. When a program step requests the descanning of a particular point, a binary coded signal identifying the point is fed from the computer accumulator to a multiplexer address register 48–1 forming part of a multiplexer control circuit generally indicated by reference numeral 48 (FIG. 3D). The multiplexer address register 48–1 contains a straight binary code group which identifies the point to be scanned. The multiplexer address register 48–1 may comprise a shift register with a bistable circuit for each bit of the code group stored therein and respective output lines 48–1a respectively extending from the individual bistable circuits to the multiplexer 4. The multiplexer 4 may comprise a conventional matrix circuit controlled by transistor, relay or other switches which are opened and closed in accordance with the "1" and "0" binary state signals on the output lines 48–1a.

The binary coded information is fed to the multiplexer address register serially from the output of an "and" gate 48–2 having three inputs. One of these inputs extend from point S23 (FIG. 5) in the computer operations register where it receives serially the various binary bits stored in the accumulator at the time a multiplexer switching operation is called for by the program routine involved. A second input line is a T1 through T29 line extending to the correspondingly identified output 35–1 of the timer shift register 35 which provides pulses at every time unit T1 through T29.

The third input to the "and" gate 48–2 extends to the M output of a flip-flop circuit 48–3. The M output has a "1" binary state signal when the flip-flop circuit is set and a "0" binary state signal when the circuit is reset. The flip-flop circuit 48–3 is reset by a time T30 pulse fed to an input reset line T30 extending to the correspondingly identified output of the shift register timer 35. The flip-flop circuit 48–3 has a set input line extending to the output of an "and" gate 48–4 which provides pulses synchronous with the T1–T29 times when the program calls for the switching of the multiplexer to the next point by order number 75 1024. The input multiplexer routine calls for this order once during each operation of the input routine as long as a point remains to be scanned during each five minute scan cycle. When the last point is scanned, this order is not called for until the 75 1024 order is called for by the clock routine approximately 5 minutes later. The latter gate is opened to produce these pulses by the connection of one of the inputs thereof by a line 48–4' to the output of "and" gate 41–2 in the decoding gate circuit 41. The "and" gate 48–4 has another input extending to the output connection S17–10 of the address register 8–3 (FIG. 5A).

The output of the "and" gate 48–4 also extends to the set input of a monostable circuit 48–5 which is triggered or set when the program calls for a multiplexer switching operation. The monostable circuit 48–5 has an output 48–5' which has a "1" binary state signal when the monostable is in its normal or reset condition and a "0" binary state signal when it is in its set condition. The monostable circuit 48–5 remains set for a time sufficient to enable the multiplexer to be set to its next point and to feed the output of the transducers through the analog to digital converter to the F.A. register 7 (FIG. 1). Then the circuit automatically returns to a normal reset condition.

The presence of a "1" binary state signal at the output 48–5' is a "not busy" or "ready" signal which, unless lockout is present, will initiate an interrupt operation in the manner previously indicated. The output 48–5' is thus connected by the aforementioned "ready" line 14 to the patchboard 30. A lockout operation will occur if the original "1" binary state signal remains on the line 14 after the completion of the multiplexer input routine. This does not occur during the usual 5 minute scanning cycle because each input routine cycle except the last point scan cycle calls for the switching of the multiplexer which triggers the monostable circuit 48–5 momentarily to cancel the "ready" signal and to initiate a second demand signal. The last point scan cycle does not call for the multiplexer switching operation (order 75 1024) so that lockout will then occur because the monostable 48–5 will remain reset and provide a persisting demand signal.

The program runs as follows: When the multiplexer "ready" signal is detected, interrupt to level 2 is initiated provided level 1 is not active. Interrupt forces the computer to obey the priority orders in location 6 which stores the sequence counter and transfers the program related to this level.

A read ADC instruction is issued which causes the ADC to read the value of the point to which the multiplexer is connected, and the value is automatically stored in a buffer register (i.e. the F.A. register 7). Meanwhile the accumulator is stored for safekeeping.

A count of 1 is added to a location in memory. The resultant count is actually the address of the next point to be selected by the multiplexer. The F.A. register is read, namely the point value, and placed in the respective location for that point in the "value block" in memory, namely location 1000 plus the count. A check is made whether the count has the maximum number equivalent to the maximum number of process points. If not, the multiplexer is switched to that number and the program proceeds to the exit sub-routine. If the maximum number is exceeded, then the count is cleared to zero and the program proceeds to the exit sub-routine without setting the multiplexer. This causes that level 2 to lock-out and will not be active until the 5 minutes have elapsed, when level 1 (i.e., the clock) will reactivate it.

Table V shows the stored program and other data stored in the 200's storage block of the computer memory for priority level 2. FIG. 14 is a flow diagram of this routine.

Table V.—*Contents of 200's storage block in computer memory for priority level 2*

| Storage address: | Contents of storage address |
|---|---|
| 200 | Sequence Counter Storage |
| 201 | Instruction Word 63 0: 20 212 (Digital Input to F.A. Register: Store Acc. in Location 212) |
| 202 | Instruction Word 22 213: 72 2048 (Add 1 to Point Count: F.A. Register to Acc.) |
| 203 | Instruction Word 00 213/ 30 1000 (Store Input Data in Location 1000 plus Point Count) |
| 204 | Instruction Word 30 211: 05 213 (N minus Point Count to Acc.) |
| 205 | Instruction Word 42 209: 02 213 (Transfer to Location 209a if Last Point: 1 plus Point Count to Acc.) |

| Storage address: | Contents of storage address |
|---|---|
| 206 | Instruction Word 75 1024: 30 210 (Switch Multiplexer to Next Point: R2 Reset Mask Bit to Acc.) |
| 207 | Instruction Word 75 4096: 30 212 (Reset R2: Restore Old Acc. Contents) |
| 208 | Instruction Word 00 200/ 40 0 (Transfer to Interrupted Program) |
| 209 | Instruction Word 26 213: 44 206 (Clear Point Counter: Transfer to Exit, Location 206*b*) |
| 210 | R2 Reset Mask Bit Digits |
| 211 | Number of Points to be Scanned |
| 212 | Old Acc. Storage |
| 213 | Point Counter |

PRIORITY LEVEL 3—BINARY TO DECIMAL CONVERSION ROUTINE

[Four digit positive integer]

In this program, a technique is used for elimination of queuing and interaction when more than one program or level share a common routine. As an example, one may consider a square root routine, or a binary to decimal conversion routine, etc. as a routine which exists in memory and which is available for use by any level. Once, say a conversion is started, it is important not to enter that routine until the conversion is completed; otherwise, data in working store pertaining to the interrupted conversion may be lost. The technique used is to assign by pseudo interrupt, a level to that shared routine, higher than the level of any of the programs which will use it.

The following is the program flow for level 3: Entry to level 3 is made by pseudo interrupt demand signals either from level 4, the log routine, or level 5, the operators' requests routine. Either level (4 or 5) requests the same facility from level 3, namely binary to decimal conversion.

When a pseudo interrupt demand signal is detected, an interrupt will be initiated provided the higher levels are not active, which will cause the computer to obey the priority orders for level 3 located in memory, location 7, and hence the sequence counter is stored, and the computer transfers to the program related to this level.

The number to be converted is already in the accumulator and hence the conversion is immediately started. The result is formed in the accumulator, and, on termination of the conversion, the program proceeds to the exit subroutine, which leaves the result in the accumulator.

Table VI shows the program instruction word groups and other data in the 300's storage block for priority level 2. FIG. 15 is a flow diagram of this routine.

*Table VI.—Contents of 300's storage block in computer memory for priority level 3*

| Storage address: | Contents of storage address |
|---|---|
| 300 | Sequence Counter Storage |
| 301 | Instruction Word 26 320: 05 316 (Clear Location 320: Subtract 1000 from Acc.) |
| 302 | Instruction Word 45 303: 22 320 (Transfer to Location 303*b* if Acc. Negative: increment Location 320) |
| 303 | Instruction Word 44 301: 04 316 (Transfer to Location 301*b*: Add 1000 to Acc.) |
| 304 | Instruction Word 10 320: 55 5 (Exchange Acc. and Location 320: Shift Acc. 5 Bits Left) |
| 305 | Instruction Word 10 320: 05 317 (Exchange Acc. and Location 320: Subtract 100 from Acc.) |
| 306 | Instruction Word 45 307: 22 320 (Transfer to Location 307*b* if Acc. Negative: Increment Location 320) |
| 307 | Instruction Word 44 305: 04 317 (Transfer to Location 305*b*: Add 100 to Acc.) |
| 308 | Instruction Word 10 320: 55 5 (Exchange Acc. and Location 320: Shift Acc. 5 Bits Left) |
| 309 | Instruction Word 10 320: 05 318 (Exchange Acc. and Location 320: Subtract 10 from Acc.) |
| 310 | Instruction Word 45 311: 22 320 (Transfer to Location 311*b* if Acc. Negative: Increment Location 320) |
| 311 | Instruction Word 44 309: 04 318 (Transfer to Location 309*b*: Add 10 to Acc.) |
| 312 | Instruction Word 10 320: 55 5 (Exchange Acc. and Location 320: Shift Acc. 5 Bits Left) |
| 313 | Instruction Word 04 320: 10 319 (Add Location 320 to Acc.: Exchange Acc. and R3 Reset Mask Bit Digits) |
| 314 | Instruction Word 75 4096: 10 319 (Reset R3: Exchange Acc. and Location 319) |
| 315 | Instruction Word 00 300/ 40 0 (Transfer to Interrupted Program) |
| 316 | 1000 |
| 317 | 100 |
| 318 | 10 |
| 319 | R3 Reset Mask Bit Digits |
| 320 | Workspace |

PRIORITY LEVEL 4—LOG DATA PREPARATION ROUTINE

The object of this program is to prepare the binary data for printout by supervising the conversion to decimal code and by entering the converted data in log data block address 2000 to 2000 plus N, where N is the number of process inputs.

Entry to this level is through pseudo interrupt demand signals either from level 1 at every hour, defining the beginning of a log, or from level 5, if an operator requests a log by pushbutton.

The interrupt starts as soon as the higher levels are inactive. This forces the computer to obey the priority orders for this level 4 located in memory location 8, which stores the sequence counter and transfers to the program pertaining to this level.

The intention is to read the binary value of a point *n*, which is stored in memory location 1000 plus *n*, convert it to decimal code by means of the routine in level 3, and then store it away in location 2000 plus *n*. A location in memory is used to keep track of the number of iterations until all points have been dealt with. This location will be called the counter.

Returning to the program, after the priority orders have been obeyed, the accumulator is stored for safekeeping and the counter is cleared.

A pseudo interrupt demand marker is set for level 3, and while this is taking place (4 word times), a count of one is added to the counter. An address is formed by adding 1000 to the count, and the contents of that address are copied in the accumulator, namely the value of point 1. At this time interrupt takes place to level 3, which starts the conversion of the data in the accumulator.

When level 3 is exited, the program in level 4 is resumed as follows: The contents of the accumulator are stored in memory location 2000 plus the count. Then, the count is compared against N, the number of process points. If equal, no further iterations are needed. A pseudo interrupt demand marker is set for level 7, the output routine, to complete the log operation at another level, and the program proceeds to the exit sub-routine. If, on the other hand, the comparison is not equal, another iteration is performed.

Table VII shows the program instruction word groups and other data in the 400's storage block for priority level 4. FIG. 16 is a flow diagram of this routine.

PRIORITY LEVEL 5—OPERATORS' REQUESTS ROUTINE

The object of this program is to accept, interpret, and process operators' requests. In this level, two operators' requests will be assumed which are initiated by pushbuttons 22a and 22b; one, requesting a log printout, and the other, a visual display of the first highest current value detected of all process points.

With the advent of an interrupt in this level 5 and provided the higher levels are not active, the computer is made to obey the priority orders for this level located in the memory location 9, which stores the sequence counter and transfers to the program pertaining to this level.

Next, the accumulator is stored for safekeeping, and at this point, it is necessary to establish which request initiated the interrupt. This is done by copying the A and C digits of the interrupt register 33 into the accumulator and examining the "C" digits in the manner previously explained. In this example, C1 was assigned as "Demand Log" and C2 as "Find and Convert Largest Value."

*Table VII.—Contents of 400's storage block in computer memory for priority level 4*

| Storage address: | Contents of storage address |
|---|---|
| 400 | Sequence Counter Storage |
| 401 | Instruction Word 20 416: 26 417 (Store Acc. in Location 416: Clear Counter in Location 417) |
| 402 | Instruction Word 30 412: 75 6144 (A3 Mask Bit Digits to Acc.: Signal Pseudo Interrupt) |
| 403 | Instruction Word 22 417/ 30 1000 (Add 1 to Counter: Data Value to Acc.) |
| 404 | Instruction Word 00 0: 00 0 (Wait for Interrupt to Level 3) |
| 405 | Instruction Word 00 417/ 20 2000 (Store Converted Value in Location 2000 plus Counter) |
| 406 | Instruction Word 30 417: 05 413 (Counter minus N to Acc.) |
| 407 | Instruction Word 42 408: 40 402 (Transfer to Location 408a if Acc. is Zero: Otherwise Transfer to Location 402a) |
| 408 | Instruction Word 30 414: 75 6144 (A7 Mask Bit Digits to Acc.: Signal Pseudo Interrupt to Output Routine) |
| 409 | Instruction Word 30 415: 75 4096 (R4 Reset Mask Bit Digits to Acc.: Reset R4) |
| 410 | Instruction Word 30 416: 00 0 (Restore Old Acc. Contents) |
| 411 | Instruction Word 00 400/ 40 0 (Transfer to Interrupted Program) |
| 412 | A3 Mask Bit Digits to Generate Pseudo Interrupt Signal |
| 413 | Number of Values to be Converted |
| 414 | A7 Mask Bit Digits to Generate Pseudo Interrupt Signal |
| 415 | R4 Reset Mask Bit Digits |
| 416 | Old Acc. Storage |
| 417 | Counter |

The C1 bit marker position is first examined for its presence. If the C1 bit marker is present, it is reset and a pseudo interrupt demand marker is set for level 4 in order to initiate the log sub-routine and the program proceeds to the exit sub-routine.

It is not necessary to examine for the presence of the other C bit markers prior to exit because as soon as the exit sub-routine is completed, an interrupt would be automatically reinitiated by the other C digit, if present.

If the C1 bit marker is not present, the C2 bit marker is reset (in this example of two demands), and the iteration counter is cleared. This counter is actually a location in memory in which a count is stored representing the number of iterations gone through, and, at the same time indicating the point number whose value is being examined. Hence after the counter is reset and location 3000 in which will be stored the highest value found, is reset, a count of one is added to the counter. This count added to 1000 forms an address from which the value of the first point in the value block in memory is copied into the accumulator. This value is subtracted from the contents of 3000. If negative, the new number is higher and is placed in location 3000 while the count which defines the point number is placed in 3001. If the subtraction is positive, the value is disregarded, leaving the contents of locations 3000 and 3001 unmodified.

The counter value is then checked to see if it has reached a value equal to N, the number of process points. If not, the iteration is restarted while if yes, the iterations are completed. It is now necessary to convert the value in locations 3000 and 3001 from binary to decimal code. This is done by setting a pseudo interrupt demand bit marker for level 3 twice. During the first time, the contents of memory location 3000 are copied into the accumulator to convert the value, and during the second time, the contents of memory location 3001 are copied into the accumulator to convert the point number.

With the termination of both conversions in level 3 and the return of the program to level 5, a pseudo interrupt demand marker is set to level 8 in order to enable the program to proceed later and execute a visual display output operation. Upon the completion of this operation, the program transfers to the exit sub-routine.

Table VIII shows the program instruction word groups and other data in the 400's storage block for priority level 5. FIG. 17 is a flow diagram of this routine.

PRIORITY LEVEL 7—PRINTER OUTPUT ROUTINE

This program organizes the transmission of data to an output device such as the log typewriter 10 (see FIG. 2A). Information is fed from the computer memory to the operations register and then to output buffer register generally indicated by reference numeral 50 in FIG. 2A. The data, in turn, is fed to a gate 52 and an output data register 54 connected to the input of the typewriter 10.

Since the contents of this program will not add anything materially to the explanation of the operation of the interrupt system, the program is not detailed herein.

PRIORITY LEVEL 8—VISUAL DISPLAY OUTPUT ROUTINE

This program organizes the transmission of data from a suitable register, such as the output buffer register 50, through a gate 55 to a visual display register 56. The output of the visual display register 56, in turn, is connected to the visual display unit 10' which indicates on lights or other means information

*Table VIII.—Contents of 500's storage block in computer memory for priority level 5*

| Storage address: | Contents of storage address |
|---|---|
| 500 | Sequence Counter Storage |
| 501 | Instruction Word 20 530: 72 1024 (Store Acc. in Location 530: Copy Interrupt Register to Acc.) |
| 502 | Instruction Word 03 523: 42 507 (Extract C1 Bit Marker and Feed to Acc.: Transfer to Location 507a if all Acc. Digits are Zero) |
| 503 | Instruction Word 75 4096: 30 526 (Reset C1: A4 Set Mask Bit Digits to Acc.) |
| 504 | Instruction Word 75 6144: 30 527 (Signal Pseudo Interrupt: R5 Reset Mask Bit Digits to Acc.) |
| 505 | Instruction Word 75 4096: 30 530 (Reset R5: Old Acc. Contents to Acc.) |
| 506 | Instruction Word 00 500/ 40 0 (Exit to Interrupted Program) |
| 507 | Instruction Word 30 524: 75 4096 (C2 Reset Mask Bit Digits to Acc.: Reset C2) |
| 508 | Instruction Word 26 531: 26 3000 (Clear Counter in Location 531: Clear Location 3000) |
| 509 | Instruction Word 22 531/ 30 1000 (Add 1 to Counter: Data Value to Acc.) |
| 510 | Instruction Word 07 3000: 41 513 (Contents Location 3000 minus Acc. to Acc. Transfer to Location 513a if Acc. Negative) |
| 511 | Instruction Word 30 531: 05 529 (Counter minus N to Acc.) |
| 512 | Instruction Word 42 515: 40 509 (Transfer to Location 515a if Counter equals N: Otherwise Transfer to Location 509a) |
| 513 | Instruction Word 27 3000: 30 531 (Contents of Location 3000 minus Acc. Location 3000: Counter to Acc.) |
| 514 | Instruction Word 20 3001: 40 511 (Store Counter in Location 3001: Transfer to Location 511a) |
| 515 | Instruction Word 30 525: 75 6144 (A3 Set Mask Bit Digits to Acc.: Signal Pseudo Interrupt) |
| 516 | Instruction Word 30 3000: 00 0 (Contents of Location 3000 to Acc.) |
| 517 | Instruction Word 00 0: 00 0 (Wait for Interrupt to Level 3) |
| 518 | Instruction Word 20 3000: 30 525 (Store Converted Value in Location 3000: A3 Set Mask Bit Digits to Acc.) |
| 519 | Instruction Word 75 6144: 30 3001 (Signal Pseudo Interrupt: Copy Location 3001 to Acc.) |
| 520 | Instruction Word 00 0: 00 0 (Wait for Interrupt to Level 3) |
| 521 | Instruction Word 20 3001: 30 528 (Store Converted Number in Location 3001: A8 Set Mask Bit Digits to Acc.) |
| 522 | Instruction Word 40 504: (Transfer to Location 504a) |
| 523 | C1 Extractor and Reset Mask Bit Digits |
| 524 | C2 Reset Mask Bit Digits |
| 525 | A3 Set Mask Bit Digits |
| 526 | A4 Set Mask Bit Digits |
| 527 | R5 Reset Mask Bit Digits |
| 528 | A8 Set Mask Bit Digits |
| 529 | Number of Data Values (N) |
| 530 | Old Acc. Storage |
| 531 | Counter | stored in the visual display register 56.

PRIORITY LEVEL 16—BASIC ROUTINE

When no demands exist at any level, the computer does not stop but executes a program which is called the basic routine. This program then would have an imaginary level 16.

The basic routine is a do-nothing loop which the computer executes until a demand at any level appears. Alternately, the basic routine may be a Test Program which tests for faults in the hardware of the machine.

Initially, when the program is started the stop interrupt switch 42–24 (FIG. 3C) is closed to transfer to the basic routine. Then, the interrupt switch 42–24 is opened so that demand signals may operate the system.

It should be understood that numerous modifications may be made of the preferred form of the invention above described, without deviating from the broader aspects of the invention.

What I claim as new and desire to protect by Letters Patent of the United States is:

1. In a monitoring system including program means for providing different program routines each of which, by various basic steps effective in sequence, carries out a different function, the improvement in a priority interrupt system for automatically operating said routines in accordance with predetermined priority levels assigned to the respective routines, said priority interrupt system comprising: respective signaling means for generating interrupt demand signals which call for operation of said program routines; interrupt register means having for each priority level and A bit storage means for storing a marker indicating the presence or absence of an interrupt demand signal for the level involved and an R bit storage means for storing a marker indicating the current activity or inactivity of a program routine having the priority level involved; means for setting an R bit marker in the R bit storage means of a given priority level when the program routine of the priority level has been activated and for removing the R bit marker when the routine is completed, means responsive to the presence of an interrupt demand signal for a priority level and the absence of corresponding A and R bit markers in said interrupt register means for setting an A bit marker in the A bit storage means of the priority level involved; means responsive to the absence of an interrupt demand signal and the presence of an R bit marker for a given priority level for removing the corresponding A bit marker once the routine involved is activated; priority status scanning means for sequentially examining the information in said A and R bit storage means of said interrupt register means in the order of highest priority first, said priority status scanning means including means responsive to the presence of an A bit marker and the absence of an R bit marker for interrupting the program routine in progress, means for storing information on the point in the interrupted routine at which the interruption took place and initiating operation of the higher priority level routine, and means operative after completion of the higher priority level routine for resuming the interrupted program at the point of interruption thereof.

2. In a monitoring or control system including computer means having means for providing different program routines each of which by various basic steps effected in sequence, carries out a different function, the improvement in a priority interrupt system for automatically operating said routines in accordance with predetermined priority levels assigned to the respective routines, said priority interrupt system comprising: respective signaling means for generating interrupt signals which call for operation of said program routines; interrupt register means including, for each priority level, an A bit storage means for storing a marker indicating the presence or absence of a demand signal for the level involved, an R bit storage means for storing a marker indicating the current activity or inactivity of a program routine having the priority level involved, and a B bit storage means for storing a marker indicating the persistence of the original demand signal after the demanded program routine has been completed; means for setting an R bit marker in the R bit storage means of a given priority level when the program routine of the priority level has been activated and for removing the R bit marker when the routine is completed; means responsive to the presence of an interrupt demand signal for a given priority level and the absence of a corresponding B and R bit markers in said interrupt register by setting an A bit marker in the A bit storage location of the interrupt register means for the priority level involved; means responsive to the presence of an A bit marker and the absence of a B bit marker in said interrupt register means upon completion of a given program routine for removing the latter A bit marker and setting a corresponding B bit marker; and priority status means for examining the A and R bit storage means of said interrupt register means to determine the relative priorities of the currently active program routine and the demanded but not fulfilled program routines, said priority status means being responsive to the presence of an A bit marker and the absence of the corresponding R bit marker for a program routine having a higher priority level than the currently operating program routine and including means for interrupting the currently operating program routine, means for storing information on the point in the currently operating routine at which the interruption takes place, means for initiating operation of the higher priority level routine, and means operative after carrying out the routine of higher priority for resuming the interrupted program at the point of interruption thereof.

3. In a monitoring or control system including computer means having means for providing different program routines each of which, by various basic steps effected in sequence, carries out a different function, the improvement in a priority interrupt system for automatically operating said routines in accordance with predetermined priority levels assigned to the respective routines, said priority interrupt system comprising: respective signaling means for generating interrupt signals which call for operation of said program routines; interrupt register means having for each priority level an A bit storage means for storing a marker indicating the presence or absence of a demand signal for the level involved, an R bit storage means for storing a marker indicating the current activity or inactivity of a program routine having the priority level involved, and a B bit storage means for storing a marker indicating the presence or absence of a separate second interrupt demand signal for a given level if the level is currently active; means for setting an R bit marker in the R bit storage means of a given priority level when the program routine of the priority level has been activated and for removing the R bit marker when the routine is completed; means responsive to the presence of an interrupt demand signal for a given priority level and the absence of a corresponding B and R bit markers in said interrupt register for setting an A bit marker in the A bit storage location of the interrupt register means for the priority level involved; means responsive to the absence of the interrupt demand signal for a given priority level and the presence of a corresponding R bit marker in said interrupt register means for removing the corresponding A bit marker from said interrupt register means; means responsive to the presence of an interrupt demand signal for a given priority level, the presence of a corresponding R bit marker, and the absence of the corresponding A bit marker in said interrupt register means indicating a second demand signal during the activation of the associated routine for setting a corresponding B bit marker in said interrupt register means; means responsive to the completion of the latter routine for resetting the B bit marker and setting the corresponding A bit marker to initiate a second operation of the routine; and priority status means for examining the A and R bit storage locations of said interrupt register means to determine the relative priorities of the currently active program routine and the demanded but not fulfilled program routines, said priority status means including means responsive to the presence of an A bit marker and the absence of the corresponding R bit marker for a program routine having a higher priority level than the currently operating program routine for interrupting the currently operating program routine and initiating operation of the higher priority level routine, said priority status means also including means operated after carrying out the routine of higher priority for resuming the interrupted program at the point of interruption thereof.

4. In a monitoring system including means for providing a selection of different program routines to be rendered operative by respective priority level demand signals calling for their operation and each of which, by various basic program steps effected in sequence, carries out at least one distinctive function, the improvement in a program control system for automatically operating said routines, when operation thereof is demanded thereof, in a sequence determined by different levels of priority assigned thereto, said program control system comprising: signal means for providing priority level demand signals, control means responsive to the priority level demand signals for operating the demanded program routines in the order of their assigned priorities, and lockout means controlled by the signal means and responsive to the persistence of a priority level demand signal beyond the completion of the associated program routine for preventing subsequent operation of said routine by said control means under the control of the priority level demand signal until the latter signal is removed and is re-established.

5. In a monitoring system including means for providing a selection of different program routines to be rendered operative by respective priority level demand signals calling for their operation and each of which, by various basic program steps effected in sequence, carries out at least one distinctive function, at least one of said program routines being a composite routine providing a number of sequentially operative sub-routines to be demanded by separate sub-routine demand signals and which carry out respectively different functions, the improvement in a program control system for automatically operating said routines when operation thereof is demanded thereof in a sequence determined by different levels of priority assigned thereto, said composite routine being assigned a single priority level, said program control system comprising: means for generating a priority level demand signal for said composite routine upon disappearance of either of said sub-routine demand signals, control means responsive to the presence of said priority level demand signals for operating the demanded program routines in the order of their assigned priorities, means responsive to the activation of said composite routine for operating the sub-routines demanded by said sub-routine demand signals, lockout means responsive to the persistence of a priority level demand signal beyond the completion of the associated program routine for preventing subsequent operation of said routine by the priority level demand signal until the latter signal disappears and is re-established again, and control means for disabling the lockout means to prevent lockout of said composite routine by the persistence of a sub-routine demand signal beyond one cycle of operation of the composite routine.

6. The monitoring system set forth in claim 5 in which said control means includes means for automatically interrupting the single priority level demand signal for the composite routine.

7. In a program controlled data handling machine capable of carrying out different programs assigned to different priority levels, a plurality of signaling means external to the machine providing interrupt demand signals representing requested interruptions in the program of the machine, first register means, means controlled by the signaling means for storing markers in the register means representing the signaling means from which interrupt demand signals have been received, priority level assigning means, means controlled by the first register means for operating the priority level assigning means to assign a priority level to the requested interruption represented by the marker stored in the first register means, second register means controlled by the priority level assigning means for storing markers representing the assigned priority levels, and control means controlled by the second register means for controlling the machine to carry out different programs in descending priority in accordance with the markers stored in the second register means.

8. In a program controlled data handling machine capable of carrying out different programs assigned to different priority levels, several of the programs being assigned to the same priority level, the combination of register means for storing a marker representing the priority level of the program being carried out by the machine, first control means for storing a marker in the register means in accordance with the program carried out by the machine, signaling means for generating interrupt demand signals in accordance with the priority levels assigned to requested programs, second control means responsive to the interrupt demand signals for controlling the machine to perform the requested programs, and means controlled by the register means for inhibiting the performance of a requested program when the register contains a marker indicating that the machine is carrying out a program having the same priority level as the requested program.

9. In a program controlled data handling machine capable of carrying out different programs assigned to different priority levels, several of the programs being assigned to the same priority level, the combination of register means for storing a marker representing the priority level of the program being carried out by the machine, first control means for storing a marker in the register means in accordance with the program carried out by the machine, signaling means for generating interrupt demand signals in accordance with the priority levels assigned to requested programs, second control means responsive to the interrupt demand signals for controlling the machine to perform the requested programs, means controlled by the register means for inhibiting the performance of a requested program when the register contains a marker indicating that the machine is carrying out a program having the same priority level as the requested program, additional register means for storing markers representing the inhibited program, and means including the additional register means and controlled by the markers therein for controlling the machine to subsequently perform the inhibited programs.

10. A priority interrupt system for a data handling machine capable of carrying out a number of different programs to which different levels of priority are assigned comprising a plurality of signaling lines, each of said signaling lines providing an interrupt signal representing the priority level of a requested program; first control means for controlling the machine to carry out requested programs in accordance with the priority levels assigned to the signals provided by the lines; register means providing a plurality of memory means each individual to one of the lines; second control means controlled by the signaling lines and the machine for selectively operating each memory means to one of three different states, a first state representing the absence of an interrupt signal from the related line, a second state representing the receipt of an interrupt signal from the related line requesting a program that has not been initiated by the machine, and a third state representing the initiation but not the completion of a requested program; and third control means controlled by the register means in accordance with the states of the plurality of memory means for controlling the first control means.

11. A priority interrupt system as claimed in claim 10 in which the third control means includes means controlled by the memory means for initiating the program requested by the highest priority line whose memory means is in the second state, said means including means for inhibiting the initiation of a requested program if the related memory means is in the third state.

12. A priority interrupt system as claimed in claim 10 including means controlled by the signaling lines and the register means for operating the memory means for a given line to a fourth state when a second interrupt demand occurs on a given line before the program requested by the first demand has been completed.

13. A priority interrupt system as claimed in claim 10 in which the system includes a number of additional lines for requesting programs assigned to the same priority level, and in which assigning means are provided for assigning to the additional lines a priority of access to the single priority level common to all of the additional lines.

14. A priority interrupt system as claimed in claim 10 in which the register means includes a signal circulating loop in which the various memory means are defined by time spaced sectors of the loop.

References Cited by the Examiner

UNITED STATES PATENTS

| | | | |
|---|---|---|---|
| 3,029,414 | 4/1962 | Schrimpf | 340—172.5 |
| 3,048,332 | 8/1962 | Brooks et al. | 235—157 |
| 3,061,192 | 10/1962 | Terzian | 235—157 |
| 3,063,036 | 11/1962 | Reach et al. | 340—172.5 |
| 3,079,082 | 2/1963 | Scholten et al. | 235—157 |

ROBERT C. BAILEY, *Primary Examiner.*

MALCOLM A. MORRISON, *Examiner.*